US009429122B2

(12) United States Patent
Akazaki et al.

(10) Patent No.: US 9,429,122 B2
(45) Date of Patent: Aug. 30, 2016

(54) FUEL INJECTION DEVICE

(71) Applicants: Honda Motor Co., Ltd., Tokyo (JP); Hitachi Automotive Systems, LTD., Ibaraki (JP)

(72) Inventors: Shusuke Akazaki, Saitama (JP); Masahiro Soma, Ibaraki (JP); Atsushi Takaoku, Ibaraki (JP)

(73) Assignees: Honda Motor Co., Ltd., Tokyo (JP); Hitachi Automotive Systems, LTD., Ibaraki (JP)

( * ) Notice: Subject to any disclaimer, the term of this patent is extended or adjusted under 35 U.S.C. 154(b) by 14 days.

(21) Appl. No.: 14/406,467

(22) PCT Filed: Jun. 7, 2013

(86) PCT No.: PCT/JP2013/003609
§ 371 (c)(1),
(2) Date: Dec. 8, 2014

(87) PCT Pub. No.: WO2013/183306
PCT Pub. Date: Dec. 12, 2013

(65) Prior Publication Data
US 2015/0152823 A1    Jun. 4, 2015

(30) Foreign Application Priority Data
Jun. 8, 2012    (JP) .................................. 2012-130922

(51) Int. Cl.
*F02M 57/00*    (2006.01)
*F02M 61/14*    (2006.01)
(Continued)

(52) U.S. Cl.
CPC ......... *F02M 57/005* (2013.01); *F02M 51/061* (2013.01); *F02M 51/0671* (2013.01);
(Continued)

(58) Field of Classification Search
CPC ............. F02M 57/005; F02M 51/061; F02M 51/0671; F02M 61/14; F02M 2200/247; F02D 35/023; F02D 2041/281; F02B 2075/125; G01L 9/00; Y02T 10/123

USPC ................ 123/445, 472, 478, 195 C, 195 E; 239/533.2; 277/591
See application file for complete search history.

(56) References Cited

U.S. PATENT DOCUMENTS 6,234,404 B1 *   5/2001   Cooke ................... F02M 47/00
                                                    239/533.9
7,225,790 B2 *   6/2007   Bartunek ........... F02M 51/0603
                                                    123/294
(Continued)

FOREIGN PATENT DOCUMENTS

| JP | 8-158982 | 6/1996 |
| JP | 9-53483 | 2/1997 |

(Continued)

OTHER PUBLICATIONS

International Search Report for Application No. PCT/JP2013/003609, 4 pages, dated Jul. 9, 2013.

*Primary Examiner* — Grant Moubry
(74) *Attorney, Agent, or Firm* — Nelson Mullins Riley & Scarborough LLP; Anthony A. Laurentano

(57) ABSTRACT

In a fuel injection device having a sensor for detecting a state in the combustion chamber in a free end thereof, the sensor signal transmitting member for transmitting the sensor signal is protected from vibrations and moisture. The fuel injection device comprises: a valve body (33) having a free end exposed to the combustion chamber (7) defined in the engine main body (3) and a base end located outside of the engine main body; a sensor (38) supported at the free end of the valve body to detect a state of the combustion chamber; a sensor signal transmitting member (91) extending from the sensor to the base end of the valve body along an exterior of the valve body to transmit a signal from the sensor; and a second resin portion (40) and/or a bonding agent (100) covering the sensor signal transmitting member and securing the sensor signal transmitting member onto an exterior of the valve body.

9 Claims, 23 Drawing Sheets

(51) Int. Cl.
*F02M 51/06* (2006.01)
*G01L 9/00* (2006.01)
*F02D 35/02* (2006.01)
*F02B 75/12* (2006.01)
*F02D 41/28* (2006.01)

(52) U.S. Cl.
CPC .......... *G01L 9/00* (2013.01); *F02B 2075/125* (2013.01); *F02D 35/023* (2013.01); *F02D 2041/281* (2013.01); *F02M 2200/247* (2013.01); *Y02T 10/123* (2013.01)

(56) References Cited

U.S. PATENT DOCUMENTS

| | | | | |
|---|---|---|---|---|
| 8,224,554 B2 * | 7/2012 | Kondo | ................ | F02M 57/005 123/456 |
| 8,469,006 B2 * | 6/2013 | Cooke | ................ | F02M 51/005 123/478 |
| 8,919,186 B2 * | 12/2014 | Kondo | ................ | F02M 47/027 73/114.51 |
| 2002/0053342 A1 * | 5/2002 | Nozaki | ................ | F02M 51/005 123/470 |
| 2006/0169244 A1 * | 8/2006 | Allen | ................ | F02D 35/021 123/297 |
| 2011/0006130 A1 * | 1/2011 | Kondo | ................ | F02M 47/027 239/71 |

FOREIGN PATENT DOCUMENTS

| | | |
|---|---|---|
| JP | 2001-512564 | 8/2001 |
| JP | 2002-202025 | 7/2002 |
| JP | 2003-227375 | 8/2003 |
| JP | 2006-527321 | 11/2006 |
| JP | 2009-536995 | 10/2009 |
| WO | 2012/115036 A1 | 8/2012 |
| WO | 2013/183306 A1 | 12/2013 |

* cited by examiner (A)

(B)

(a)

(b)

(a)

(b)

(a)

(b)

(a)

(b)

FUEL INJECTION DEVICE

RELATED APPLICATIONS

This application is a 35 U.S.C. 371 national stage filing of International Application PCT/JP2013/003609, filed Jun. 7, 2013, which claims priority to Japanese Patent Application No. 2012-130922 filed on Jun. 8, 2012 in Japan. The contents of the aforementioned application s are hereby incorporated by reference.

TECHNICAL FIELD

The present invention relates to a fuel injection device for internal combustion engines, and in particular to a fuel injection device having a sensor for detecting a state of the combustion chamber mounted on the free end thereof.

BACKGROUND OF THE INVENTION

In a direct injection engine, a fuel injection device is mounted on the cylinder head such that the free end of the valve body defining the outer shell of the fuel injection device is exposed in the combustion chamber. Fuel injection orifices are formed at the free end of the valve body, and the fuel is injected into the combustion chamber from the injection orifices according to the movement of a valve member provided in the valve body. It has been proposed to support a pressure detection device at the free end of the valve body in such a fuel injection device to detect the pressure in the cylinder. See Patent Document 1, for instance. According to the fuel injection device disclosed in Patent Document 1, the pressure detection device is provided with an annular configuration so as to receive the free end of the valve body therein, and welded to the valve body so as to be exposed to the combustion chamber.

In such a fuel injection device, because the pressure detection device is supported by the valve body, there is no need to change the configurations of the combustion chamber or the cylinder head for installing the pressure detection device. Because there is no contact between the pressure detection device and the cylinder head, vibrations that could be transmitted to the pressure detection device from sources such as other cylinders, the valve actuating mechanism and the head cover via the cylinder head can be minimized. Also, the pressure detection device is protected from thermal damages owing to the cooling effect of the fuel that passes through the valve body.

PRIOR ART DOCUMENT(S)

Patent Document(S)

Patent Document 1: WO2012/115036

SUMMARY OF THE INVENTION

Task to be Accomplished by the Invention

In such a fuel injection device having a pressure detection device at the free end of the valve body, it is important to properly wire (lay out) the detection signal transmitting wire (detection signal transmitting member) for transmitting the signal from the pressure detection device. The detection signal transmitting wire is required to be drawn out from the base end of the valve body which is located away from the cylinder head to be connected to an external circuit. In the fuel injection device disclosed in Patent Document 1, a receiving groove extending in the axial direction is formed on the exterior of the valve body, and the signal transmitting member is received in this receiving groove. However, because the valve body vibrates owing to the driving movement of the valve member, if the signal transmitting member is simply placed in the receiving groove, the signal transmitting member may oscillate, and repeated collide with the valve body so that the transmitted signal may be contaminated by noises. Also, due to contact with moisture such as rainwater, the signal transmitting member may corrode over time. Thus, the conventional arrangement may not have been adequate for the protection of the signal transmitting member.

In view of such a problem of the prior art, a primary object of the present invention is to protect the sensor signal transmitting member for transmitting the sensor signal from vibrations and moisture.

Means to Accomplish the Task

To achieve such an object, the present invention provides a fuel injection device, comprising: a valve body (33) having a free end exposed to a combustion chamber (7) defined in an engine main body (3) and a base end located outside of the engine main body; a sensor (38) supported at the free end of the valve body to detect a state of the combustion chamber; a sensor signal transmitting member (91) extending from the sensor to the base end of the valve body along an exterior of the valve body to transmit a signal from the sensor; and a covering member (40, 100) covering the sensor signal transmitting member and securing the sensor signal transmitting member onto an exterior of the valve body.

According to this structure, because the sensor signal transmitting member is fixed to the exterior of the valve body by the covering member, the vibrations that may be transmitted to the sensor signal transmitting member via the valve body is prevented from causing any undue oscillation or deformation of the sensor signal transmitting member, and the sensor signal transmitting member is prevented from hitting the exterior of the valve body. Therefore, the noises that may be produced in the sensor signal transmitted by the sensor signal transmitting member by the oscillation and deformation of the sensor signal transmitting member or by the collision of the sensor signal transmitting member with the valve body can be minimized. By being covered by the covering member, the sensor signal transmitting member is prevented from being exposed to moisture.

In such an invention, the fuel invention device may further comprise a first resin portion (39) molded to the base end of the valve body and provided with a connector portion (120) internally provided with a first connecting terminal (124) and a connecting member (128) extending from the first resin portion and connected to the sensor signal transmitting member, wherein the covering member includes a second resin portion (40) molded to the valve body and the first resin portion, and covering the sensor signal transmitting member and a part of the connecting member projecting from the first resin portion.

According to this structure, the connecting member may be connected to the sensor signal transmitting member after the first resin portion has been molded, and the sensor signal transmitting member may be covered, and attached to the valve body by molding the second resin portion thereonto. Therefore, when the fuel injection device is to be manufactured without the sensor, the sensor signal transmitting member and the second resin portion may be omitted along with the sensor. In other words, the fuel injection device can be adapted as a model with a sensor and a model without a sensor without any difficulty, and this enhances the versatility of the manufacturing process.

In such an invention, the fuel injection device may further comprise an actuator (37) received in the valve body; a drive signal transmitting member (83, 84) extending from the actuator to transmit a drive signal to the actuator; and a second connecting terminal (125, 126) provided in the connector portion and connected to the drive signal transmitting member.

According to this arrangement, the actuator and the sensor can share the same connector member, and this simplifies the structure and facilitates the connecting process.

In such an invention, it is preferred that a receiving groove (98, 103) for receiving the sensor signal transmitting member is formed on an exterior of the valve body, and the covering member includes a bonding agent (100) that covers the sensor signal transmitting member and fixedly secures the sensor signal transmitting member.

According to this arrangement, because the sensor signal transmitting member is secured to the valve body by the bonding agent, the sensor signal transmitting member is prevented from moving during the process of molding the second mold portion, and the sensor signal transmitting member can be maintained at the prescribed position even after the second mold member has been molded. Even when moisture should intrude into the gap between the second resin portion and the valve body, because the sensor signal transmitting member is covered by the bonding agent, the moisture is prevented from reaching the sensor signal transmitting member.

In such an invention, the fuel injection device may further comprise a stay member (108) attached to an exterior of the valve body to support a base end of the sensor signal transmitting member, the stay member being covered by the second resin portion.

According to this arrangement, because the base end of the sensor signal transmitting member is secured to the valve body by the stay member, the movement of the sensor signal transmitting member is prevented during the process of molding the second resin portion, and the sensor signal transmitting member can be maintained at the prescribed position in the second resin portion.

In such an invention, the first resin portion and the second resin portion may be provided with interlocking engagement features (148) on mutually contacting parts thereof.

Thereby, intrusion of moisture via the mutually contacting parts (interface) between the first resin portion and the second resin portion can be avoided.

In such an invention, the valve body and the second resin portion may be provided with interlocking engagement features (105, 106) on mutually contacting parts thereof.

Thereby, intrusion of moisture via the mutually contacting parts (interface) between the valve body and the second resin portion can be avoided.

In such an invention, the fuel injection valve may further comprise a seal device (92) provided on an exterior of the valve body for sealing an interface between the valve body and the engine main body, wherein the seal device and the second resin portion are in contact with each other and provided with interlocking engagement features (146) on mutually contacting parts thereof.

Thereby, intrusion of moisture via the mutually contacting parts (interface) between the seal device and the second resin portion can be avoided.

In such an invention, it is preferred that the seal device is provided with a collar member (93) fitted onto an outer circumference of the valve body, and a flexible member (95) fitted on an exterior of the collar member to seal an interface between the collar member and the engine main body, and an engagement portion (97) is formed in an outer circumferential part of the collar member located more outward of the engine main body than the flexible member to engage a tool for retaining the collar member when press fitting the collar member onto the valve body.

According to this arrangement, retaining the collar member with a tool is simplified when press fitting the collar member onto the valve body. Because the engagement portion is located more outward of the engine main body than the flexible member serving as a seal member, the engagement portion is not exposed to gases such as the non-combusted gas and combusted gas of the combustion chamber so that foreign matter such as carbon is prevented from being deposited in the engagement portion. If the engagement portion is located closer to the combustion chamber than the flexible member, causing carbon to be deposited in the engagement portion, the collar member and the engine main body may become stuck to each other at the engagement portion so that removing the fuel injection device from the engine main body may become impossible.

In such an invention, the sensor signal transmitting member may consist of a flexible printed circuit board, and be bent in conformity with an outer contour of the valve body.

According to this arrangement, the sensor signal transmitting member may extend closely along the contour of the valve body.

According to another aspect of the present invention, the fuel injection device for directly injecting fuel into a cylinder of an engine, comprises: a nozzle member fitted into an injector hole formed in the cylinder; an electromagnetic coil for opening and closing the fuel injection valve with an electromagnetic force; a state detecting unit mounted on the nozzle member for detecting a state of the cylinder; a single connector mold member for retaining a first external terminal having an end connected to a wire for supplying electric current to the electromagnetic coil and a second external terminal having an end connected to a wire for feeding out a detection signal detected by the state detecting unit; and a signal wire having an end connected to the state detecting unit and another end connected to another end of the second external terminal; the other end of the second external terminal being a projecting part projecting from the connector mold member and the other end of the signal wire being an exposed part thereof free from a sheath, wherein the projecting part of the second external terminal is electrically connected to the exposed part of the signal wire via a bonding material, and the projecting part of the second external terminal and the exposed part of the signal wire are covered by a bonding agent which is in turn covered by a resin mold member.

In this fuel injection valve, preferably, the connector mold member is provided with a projection projecting from a face of the connector mold member facing the state detecting unit, and the projecting part projects from the projection toward the state detecting unit.

Effect of the Invention

Owing to such a structure, in a fuel injection device provided with a sensor for detecting a condition in the combustion chamber in a front end part thereof, the sensor signal transmitting member for transmitting the sensor signal is protected from vibrations and moisture.

DESCRIPTION OF THE PREFERRED EMBODIMENT(S)

Embodiments of the fuel injection device for a direct injection engine of a motor vehicle are described in the following with reference to the appended drawings.

First Embodiment

Figure 1:
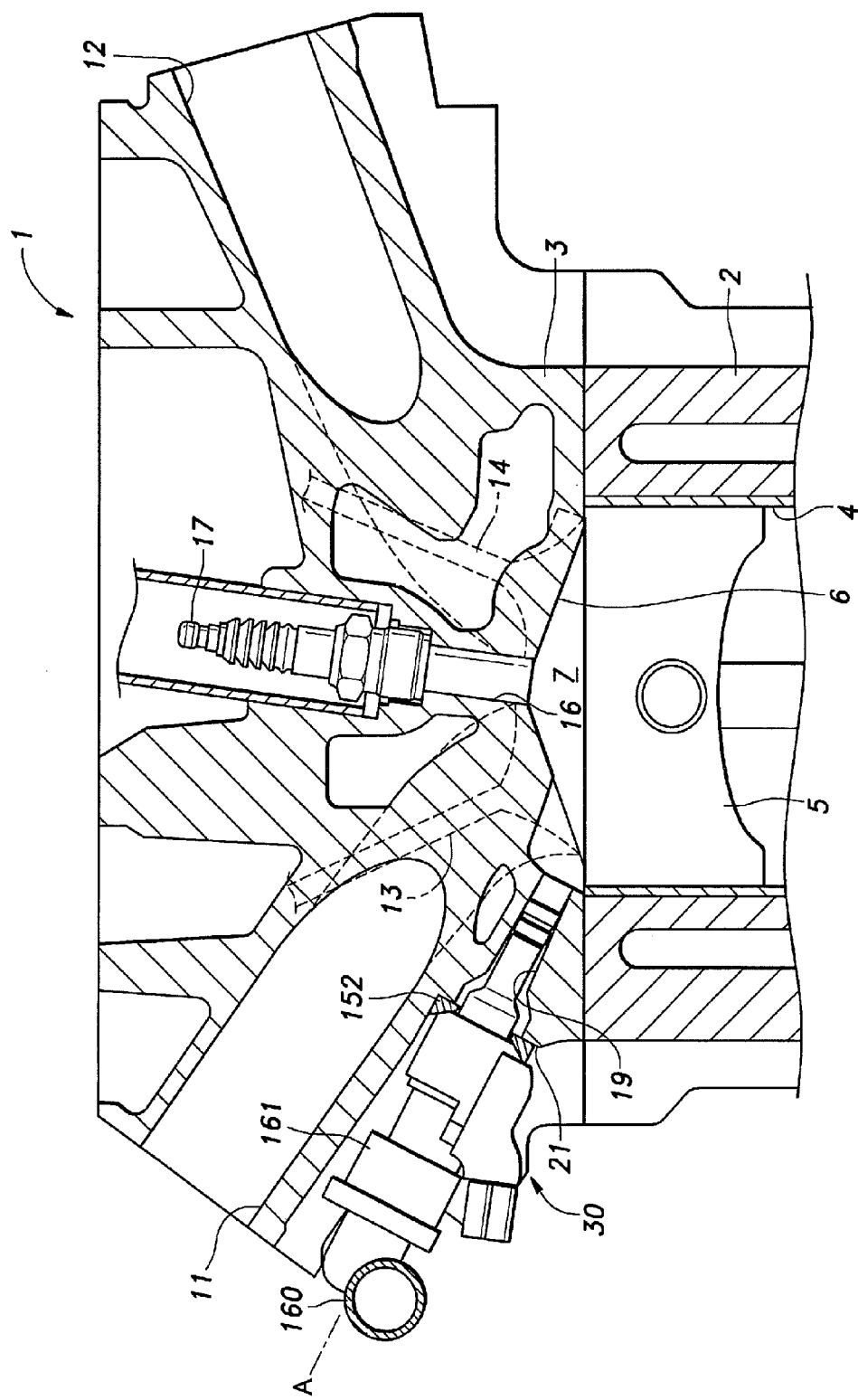
FIG. 1 is a sectional view of an internal combustion engine including a fuel injection device given as a first embodiment of the present invention.

FIG. 1 is a sectional view of an automotive internal combustion engine including a fuel injection device 30 given as a first embodiment of the present invention. As shown in FIG. 1, the automotive engine 1 includes a cylinder block 2 and a cylinder head 3 attached to the upper end of the cylinder block 2. The cylinder block 2 and the cylinder head 3 are made of electro-conductive metallic material, and are electrically grounded. The cylinder block 2 defines a plurality of cylinders 4, and a piston 5 is received in each cylinder 4 so as to be slidable in the axial direction. A part of the cylinder head 3 opposing each cylinder 4 is formed with a semi-spherical combustion chamber recess 6 which defines a combustion chamber 7 in cooperation with the upper face of the piston 5.

A pair of intake ports 11 open out on one side of the combustion chamber recess 6. Each intake port 11 extends from the combustion chamber recess 6 to a side wall of the cylinder head 3 to open out therefrom. A pair of exhaust ports 12 open out on the other side of the combustion chamber recess 6. Each exhaust port 12 extends from the combustion chamber recess 6 to an opposite side wall of the cylinder head 3 to open out therefrom. The parts of the intake ports 11 and the exhaust ports 12 opening out to the combustion chamber recess 6 are provided with intake valves 13 and exhaust valves 14, respectively. A spark plug mounting hole 16 is passed vertically across the thickness of the cylinder head 3 in a central part of the combustion chamber recess 6 surrounded by the intake ports 11 and the exhaust ports 12. A spark plug 17 is inserted in the spark plug mounting hole 16, and fixed therein.

An end (inner end) of an injector hole 19 opens out at a side part of the combustion chamber recess 6 located between the two intake ports 11. The injector hole 19 extends linearly along an axial line thereof, and the other (outer) end opens out from a side wall of the cylinder head 3. The outer end of the injector hole 19 is placed in a part of the side wall closer to the cylinder block 2 than the intake ports 11. The outer end of the injector hole 19 is surrounded by a mounting seat 21 defining a plane perpendicular to the axial line of the injector hole 19. The injector hole 19 is provided with a circular cross section, and has a diameter that changes progressively in a middle part thereof from the wider outer end to the narrow inner end. Thus, the injector hole 19 is passed across the thickness of the cylinder head 3, and communicates the combustion chamber 7 with the exterior of the cylinder head 3.

A fuel injection device (injector) 30 is inserted in the injector hole 19, and extends along a prescribed axial line A. The fuel injection device 30 is provided with a free end (with respect to the axial line A thereof) which is exposed to the combustion chamber 7 and a base end extending out of the cylinder head 3 from the injector hole 19.

Figure 2:
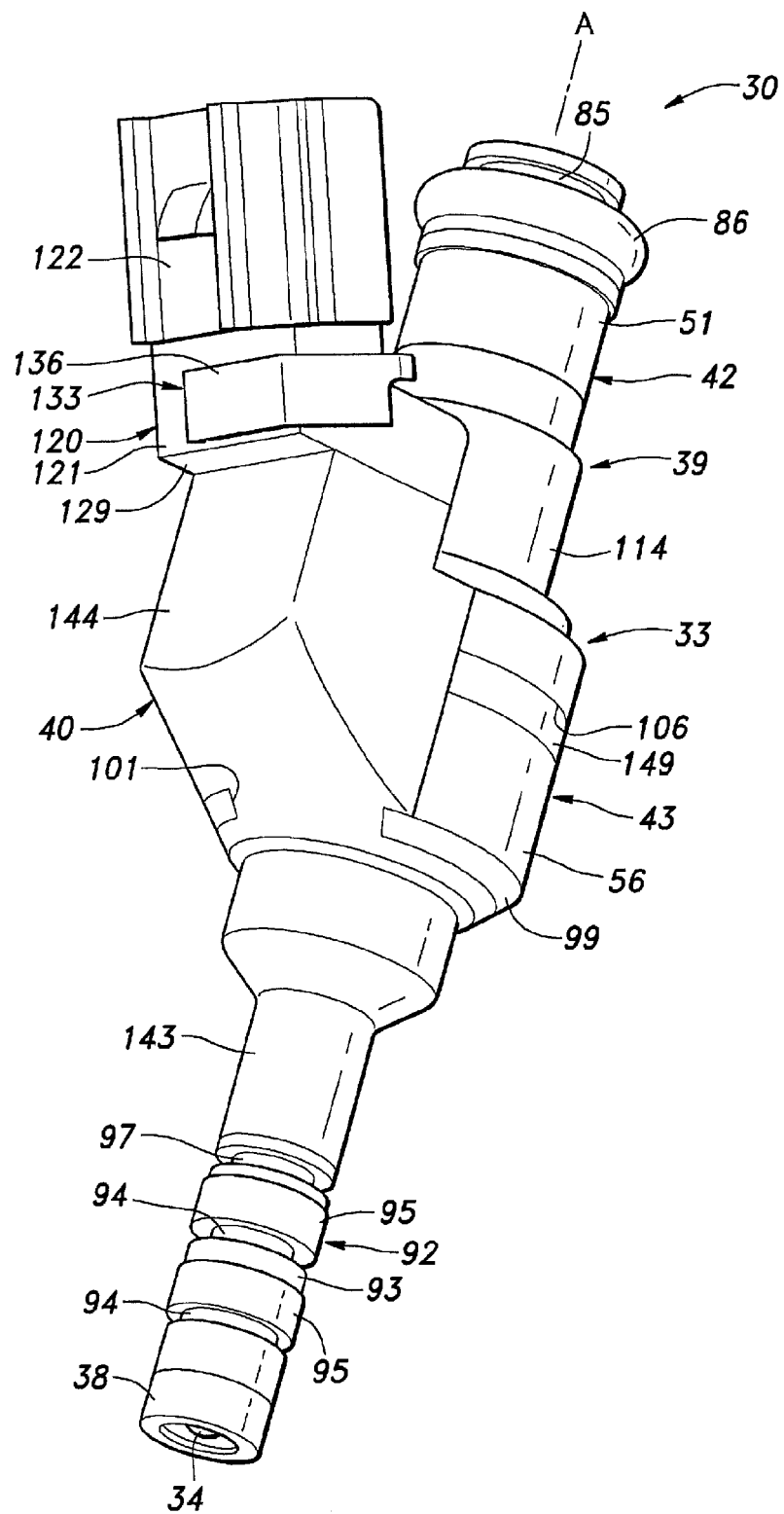
FIG. 2 is a perspective view of the fuel injection device (with the shield cover removed)
Figure 3:
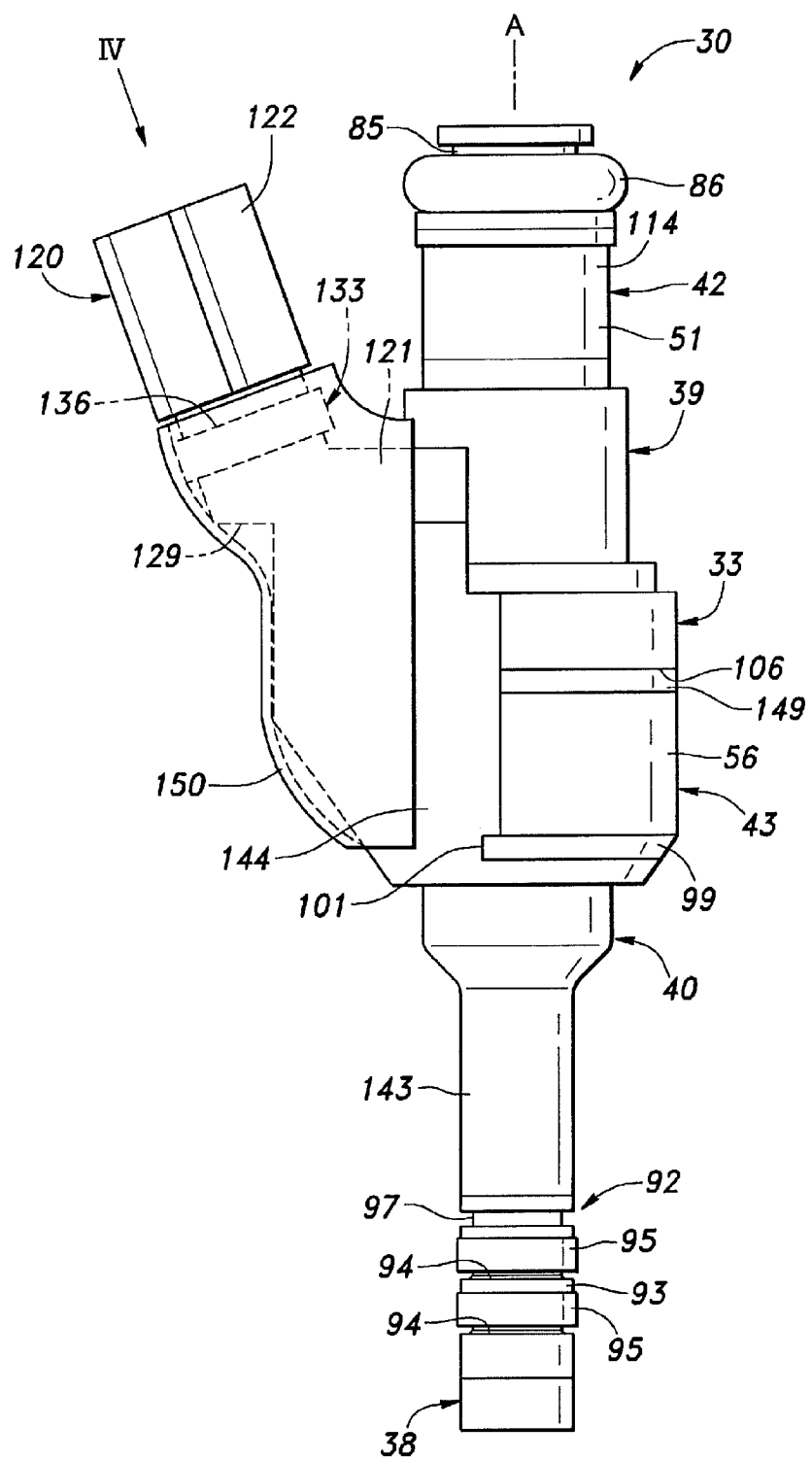
FIG. 3 is a side view of the fuel injection device.
Figure 4:
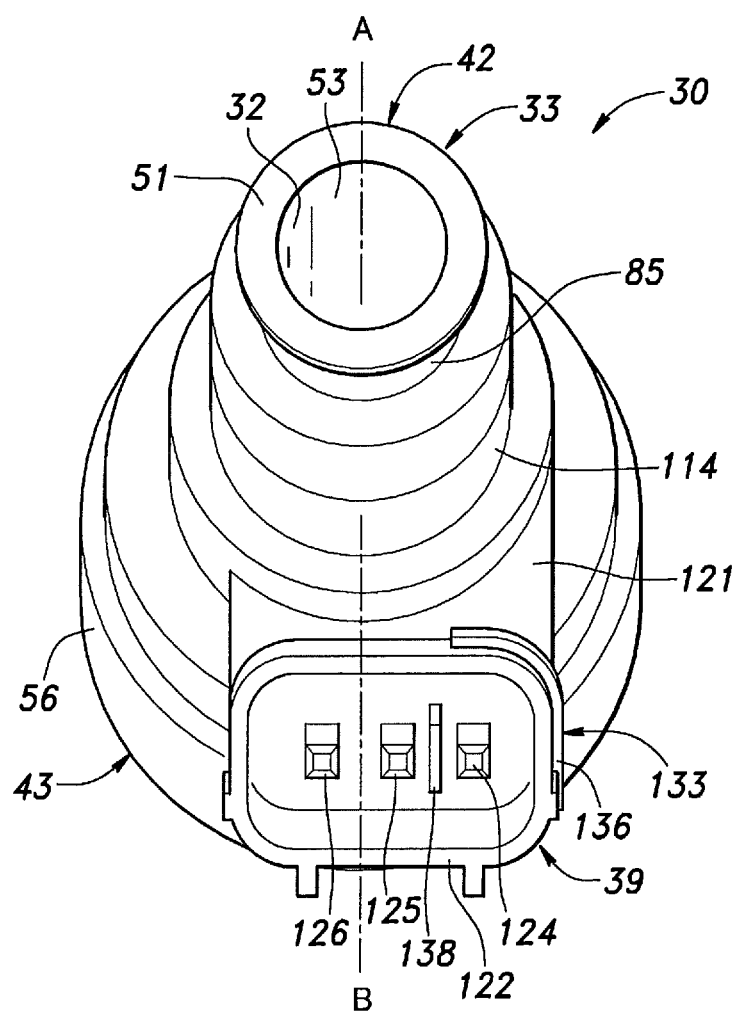
FIG. 4 is a perspective view of the fuel injection device as seen in the direction indicated by arrow IV in FIG. 3.
Figure 5:
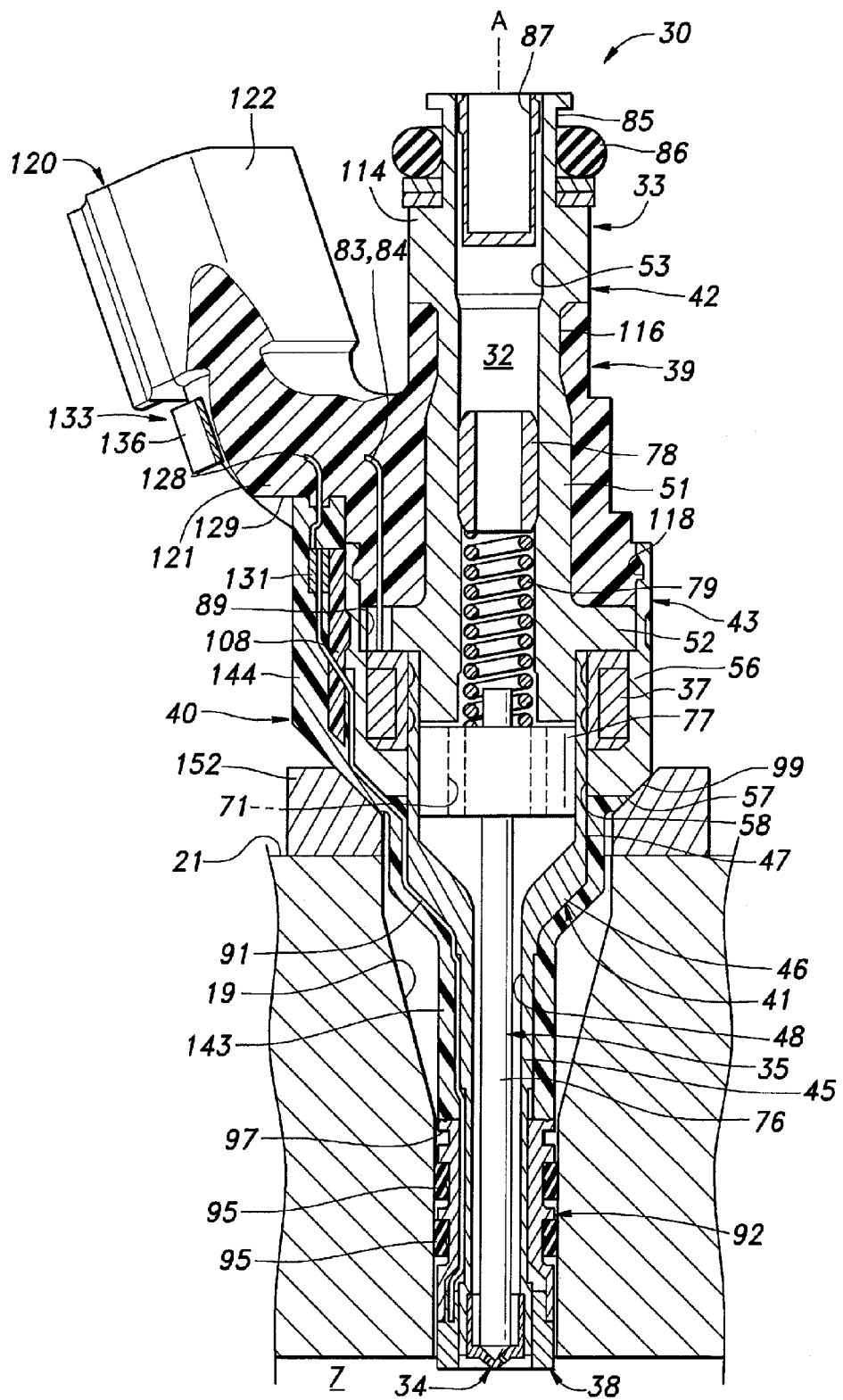
FIG. 5 is a sectional view of the fuel injection device as mounted on the internal combustion engine.

FIG. 2 is a perspective view of the fuel injection device (with a shield cover thereof removed), FIG. 3 is a side view of the fuel injection device, FIG. 4 is a perspective view of the fuel injection device as seen in the direction indicated by arrow IV in FIG. 3, and FIG. 5 is a sectional view of the fuel injection device as mounted on the internal combustion engine. As shown in FIGS. 2 to 5, the fuel injection device 30 includes a valve body 33 having a fuel passage 32 defined therein, a nozzle member 34 provided at the free end of the valve body 33, a valve member 35 received in the fuel passage 32 so as to be moveable in the axial direction, a solenoid (actuator) 37 for driving the valve member 35 and a sensor 38 provided in a peripheral part of the free end the valve body 33. A first resin portion 39 and a second resin portion (cover member) 40 are insert molded on the exterior of the valve body 33.

The valve body 33 includes a first body 41, a second body 42 and a third body 43. The first to third bodies 41 to 43 are made of electro-conductive, paramagnetic material. The first body 41 extends coaxially to the axial line A of the fuel injection device 30, and includes a small diameter portion 45, a tapered portion 46 and a large diameter portion 47 in that order from the free end to the base end. The small diameter portion 45, the tapered portion 46 and the large diameter portion 47 are provided with circular cross sections, and are coaxial to one another. The large diameter portion 47 is provided with a larger diameter than the small diameter portion 45, and diameter of the tapered portion 46 progressively increases from the free end to the base end thereof. The first body 41 is provided with a first hole 48 extending through the length of the first body 41 in a coaxial relationship (to the axial line A) from the free end to the base end thereof. The first hole 48 is greater in diameter on the side of the large diameter portion 47 than on the side of the small diameter portion 45.

The second body 42 includes a columnar shaft portion 51 extending coaxially with the axial line A of the fuel injection device 30 and a disk-shaped radial flange 52 extending radially outward from an outer circumferential surface of the shaft portion 51 at a certain distance from the free end of the shaft portion 51. The second body 42 is coaxially connected to the first body 41 by fitting the free end of the shaft portion of the second body 42 into the large diameter portion 47 of the first body 41. The inserting depth of the second body 42 into the first body 41 is determined by the abutting of the base end surface of the large diameter portion 47 of the first body 41 onto the flange 52 of the second body 42. A second hole 53 is passed through the length of the shaft portion 51 in a coaxial relationship to the axial line A. By connecting the first and second bodies 41 and 42 to each other, the first and second holes 48 and 53 communicate with each other, thereby jointly defining the fuel passage 32.

The third body 43 includes a cylindrical tubular portion 56 and an end wall 57 closing an end of the tubular portion 56. A circular insertion hole 58 is passed through the center of the end wall 57 in a coaxial relationship. The inner circumferential surface of the tubular portion 56 is provided with an enlarged portion dimensioned to receive the flange 52 of the second body 42 adjacent to the open end thereof. The third body 43 is combined with the first and second bodies 41 and 42 in a coaxial relationship by fitting the large diameter portion 47 of the first body 41 into the insertion hole 58 and placing the flange 52 of the second body 42 in the tubular portion 56 with the end wall 57 located ahead of the tubular portion 56. The third body 43 is positioned with respect to the first and second bodies 41 and 42 by the flange 52 abutting an annular shoulder defined on the inner circumferential surface of the tubular portion 56. As a result, an annular solenoid chamber is defined by the tubular portion 56, the end wall 57 and the flange 52 around the outer circumferential surface of the large diameter portion 47 of the first body 41. The first, second and third bodies 41 to 43 are fixedly joined to one another by welding performed in appropriate parts.

Figure 6:
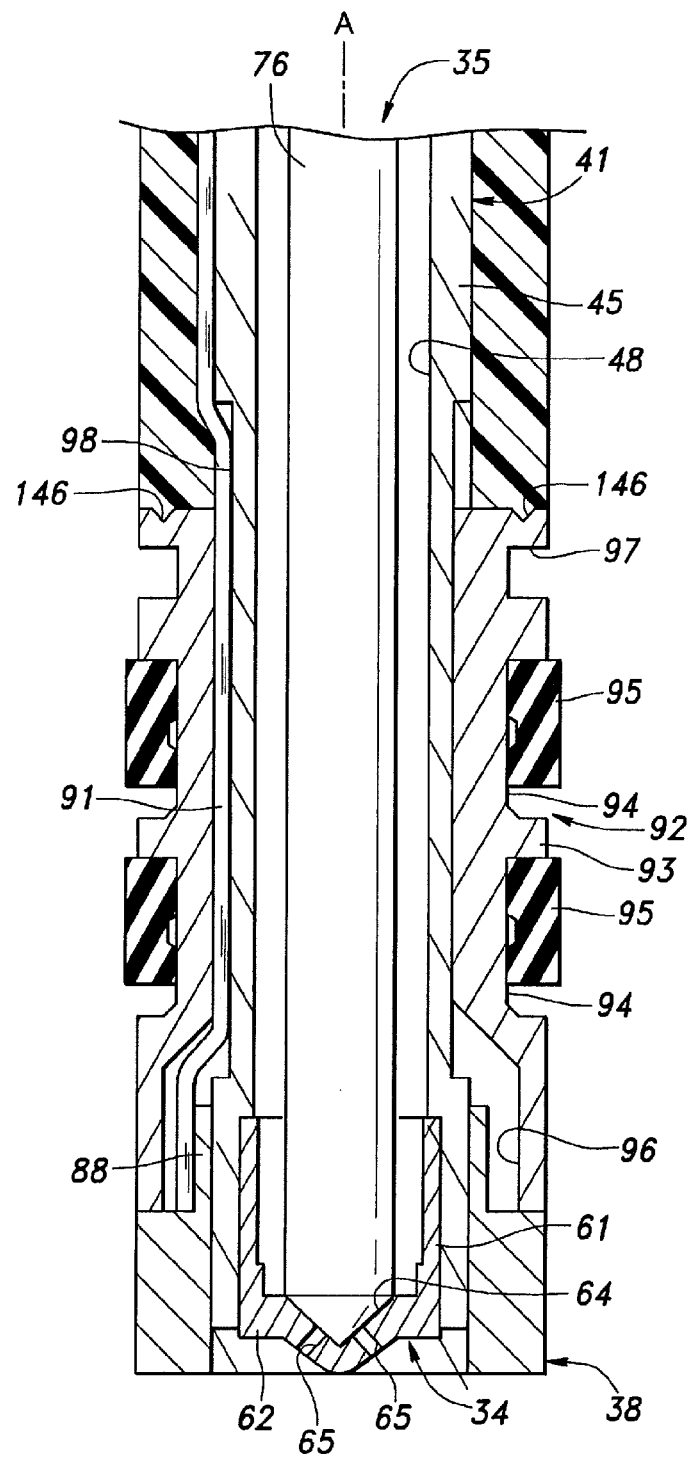
FIG. 6 is an enlarged sectional view of a free end of the fuel injection device.

FIG. 6 is an enlarged sectional view of the free end of the fuel injection device. As shown in FIG. 6, the nozzle member 34 includes a tubular circumferential wall 61 and a bottom wall 62 closing an end of the circumferential wall 61 so as to define a cup-shape. The circumferential wall 61 is fitted into an open free end of the first hole 48 with the bottom wall 62 located ahead of the circumferential wall 61. The nozzle member 34 is fixedly attached to the first body 41 by welding the free end of the circumferential wall 61 to the free end of the small diameter portion 45. The central part of the bottom wall 62 bulges forward in a semi-spherical shape, and defines a valve seat 64 in the recessed inner surface of this bulge. The central part of the bottom wall 62 is provided with a plurality of injection orifices 65 passed through the thickness thereof.

As shown in FIG. 5, the valve member 35 includes a rod 76 extending through the first hole 48 along the axial line A and an enlarged diameter portion 77 formed thereto. The enlarged diameter portion 77 has an outer diameter which is greater than the inner diameter of the free end of the second hole 53, and is configured to abut the front end surface of the shaft portion 51. The free end of the rod 76 is configured to snugly seat on the valve seat 64 formed in the nozzle member 34. The enlarged diameter portion 77 is provided with a plurality of fuel holes 71 passed through the enlarged diameter portion 77 in parallel with the axial line A. Thus, the first hole 48 and the second hole 53 communicate with each other via the fuel holes 71. The valve member 35 is made of paramagnetic material.

A cylindrical spring seat 78 is press fitted into the second hole 53. A first spring 79 consisting of a compression coil spring is interposed between the spring seat 78 and the enlarged diameter portion 77 of the valve member 35. The first spring 79 urges the valve member 35 toward the free end so that the free end of the rod 76 is normally seated on the valve seat 64 of the nozzle member 34, and the first hole 48 is shut off from the injection orifices 65.

The solenoid chamber receives the annular solenoid (coil) 37 centered around the axial line A. The two ends of the coil wire of the solenoid 37 are connected to a first and a second solenoid wire (drive signal transmitting member) 83 and 84. The first and second solenoid wires 83 and 84 are passed through through holes 89 formed in the flange 52, and drawn out from the base end of the valve body 33. In an alternate embodiment, the two ends of the coil wire of the solenoid 37 are drawn out of the valve body 33, and are used as the first and second solenoid wires 83 and 84. The first and second solenoid wires 83 and 84 are integrally bundled together over a most length thereof. In an alternate embodiment, the first and second solenoid wires 83 and 84 extend in a mutually spaced apart, parallel relationship.

An annular O ring groove 85 is formed circumferentially around the base end of the shaft portion 51. The O ring groove 85 receives an elastic O ring 86 therein. The open end of the second hole 53 in the base end part thereof is fitted with a filter 87 to remove foreign matters from the fuel.

The sensor 38 detects a state of the combustion chamber 7, and may consist of a per se known sensor such as a pressure sensor for detecting a pressure in the combustion chamber 7, a temperature sensor for detecting a temperature in the combustion chamber 7 and an oxygen sensor for detecting an oxygen concentration in the combustion chamber 7. In the first embodiment, the sensor 38 consists of a pressure sensor consisting of a cylindrical piezo-electric device. The sensor 38 is mounted on the outer periphery of the free end of the small diameter portion 45 by receiving the free end of the small diameter portion 45 in the central bore of the sensor 38. The sensor 38 is fixedly secured to the small diameter portion 45 by welding such that the sensor 38 is supported by the free end of the valve body 33. As shown in FIG. 6, the base end of the outer periphery of the sensor 38 is reduced in diameter in a step-wise fashion so as to define a connecting portion 88.

An end of a first sensor wire 91 (sensor signal transmitting member) for transmitting an electric signal from the sensor 38 is connected to the connecting portion 88 by soldering or the like. In the first embodiment, the first sensor wire 91 consists of a per se known flexible printed circuit board (FPC) including electroconductive foil covered by insulating film. In an alternate embodiment, the first sensor wire 91 consists of a per se known cable including an electroconductive member covered by an insulating layer. As will be described hereinafter, the first sensor wire 91 extends to the base end along the exterior of the valve body 33.

A seal device 92 is mounted on a part of the free end of the periphery of the small diameter portion 45 on the base end side of the sensor 38. The seal device 92 includes a cylindrical collar member 93 receiving the small diameter portion 45 therein. The outer circumferential surface of the collar member 93 is provided with a pair of annular seal grooves 94 extending circumferentially around the collar member 93. An annular gas seal member (tip seal) 95 is received in each seal groove 94. The free end of the inner circumference of the collar member 93 is formed with a receiving portion 96 consisting of a step-wise enlarged diameter portion. The receiving portion 96 receives the connecting portion 88 of the sensor 38, and covers the exterior of the connecting portion 88. The sensor 38 is welded to the collar member 93 at appropriate points. The collar member 93 fitted with the sensor 38 is press fitted into the small diameter portion 45, and is welded thereto at appropriate parts.

An engagement groove 97 is formed circumferentially around in a part of the outer circumference of the collar member 93 closer to the base end than the two seal grooves 94. When press fitting the collar member 93 fitted with the sensor 38 onto the small diameter portion 45, a tool (jig) is engaged by the engagement groove 97, and forced toward the base end side of the small diameter portion 45, causing the collar member 93 to be press fitted onto the small diameter portion 45. Because the engagement groove 97 is located on the side of the collar member 93 remote from the sensor 38, the load applied by the tool is prevented from being transmitted to the sensor 38 so that the deformation and other influences on the sensor 38 can be minimized. Once the fuel injection device 30 is placed in the injector hole 19, because the engagement groove 97 is located closer to the base end than the two gas seal members 95, the engagement groove 97 is not exposed to the gas from the combustion chamber including both the combusted gas and the uncombusted gas so that carbon and other foreign matters are prevented from being deposited in the engagement groove 97.

Figure 7:
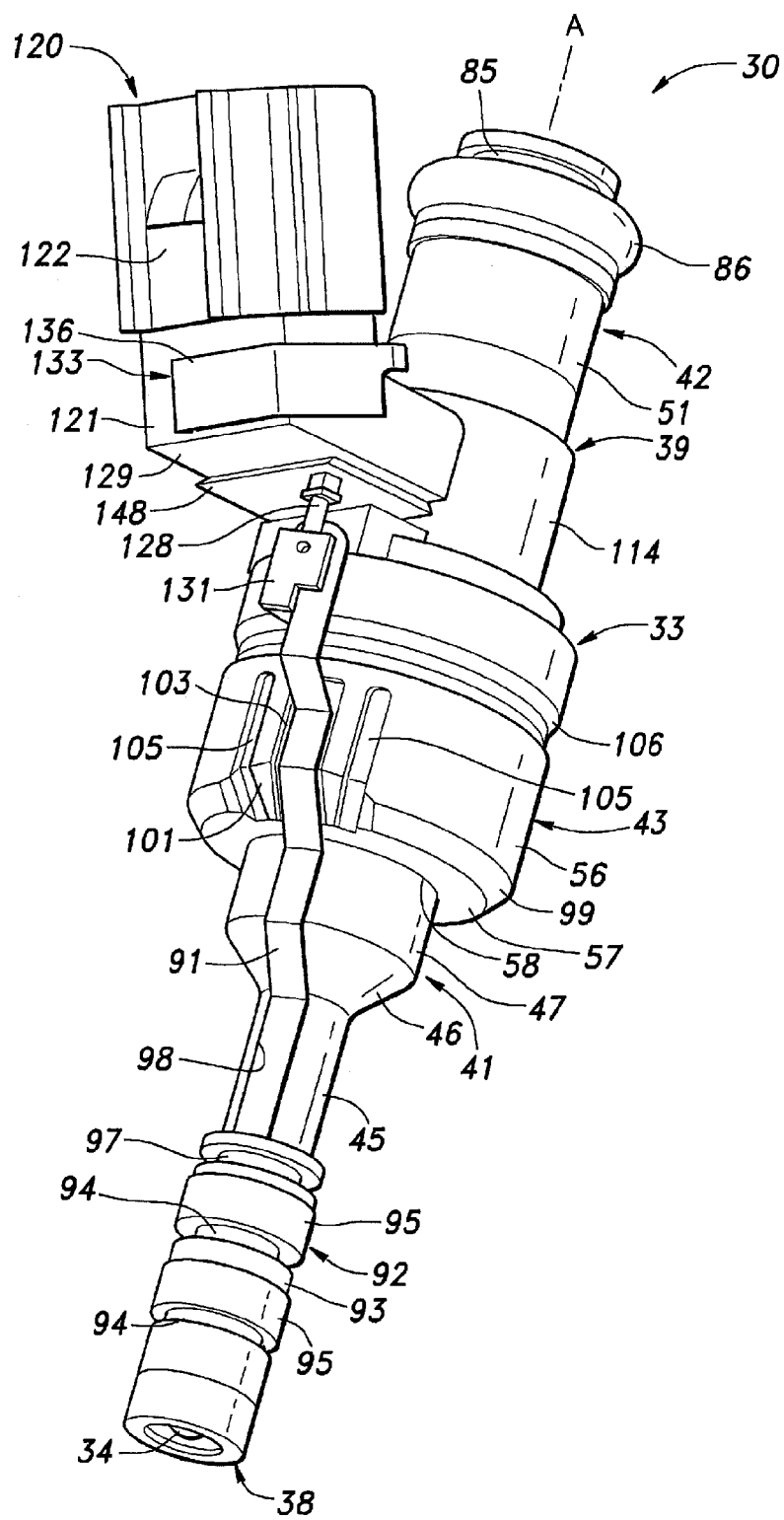
FIG. 7 is a perspective view of the fuel injection device (with the shield cover, the second resin portion and the stay member removed)

FIG. 7 is a perspective view of the fuel injection device (with the shield cover, the second resin portion and the stay member removed). As shown in FIGS. 5 to 7, a first receiving groove 98 extending in the axial direction over the small diameter portion 45, the tapered portion 46 and the large diameter portion 47 is formed on the outer surface of first body 41. The part of the first receiving groove 98 in the part of the small diameter portion 45 opposing the collar member 93 is provided with a greater depth than other parts. The part of the first receiving groove 98 having the greater depth extends from the part of the free end corresponding to the receiving portion 96 beyond the part of the base end corresponding to the collar member 93.

The free end of the tubular portion 56 is provided with a tapered surface 99 extending over the entire circumferential surface and defining a progressively smaller diameter toward the free end thereof. The part of the free end of the tubular portion 56 coinciding with the base end of the first receiving groove 98 is formed with a recess 101 which extends from the base end to the free end via the tapered surface 99. The recess 101 is provided with a width (in the circumferential direction) broader than that of the first receiving groove 98.

A second receiving groove 103 is formed in a circumferentially central part of the recess 101 so as to correspond to the base end of the first receiving groove 98. The second receiving groove 103 extends from the free end of the recess 101 to an axially intermediate part of the tubular portion 56 beyond the upper edge of the recess 101. A pair of first engagement grooves 105 are formed on either side of the first receiving groove 98, and extend in parallel with the first receiving groove 98. The free end of each first engagement groove 105 is located in the recess 101, and the base end of each first engagement groove 105 extends to an axially intermediate point of the tubular portion 56. An annular second engagement groove 106 is formed circumferentially around the tubular portion 56 at a small distance from the base ends of the second receiving groove 103 and the first engagement grooves 105.

The first sensor wire 91 extends from the connecting portion 88 of the sensor 38 to the base end of the seal device 92 (collar member 93) along the first receiving groove 98, and further extends to the base end of the first receiving groove 98 or the base end of the small diameter portion 45 along the first receiving groove 98. Then, the first sensor wire 91 comes out from the first receiving groove 98, and extends towards the base end along the outer surface of the tapered portion 46 and the large diameter portion 47. Thereafter, the first sensor wire 91 leaves the outer surface of the large diameter portion 47, and extends inside the second receiving groove 103 until the first sensor wire 91 reaches the base end of the second receiving groove 103. Thereafter, the first sensor wire 91 extends radially outward from the second receiving groove 103, and terminates at the base end thereof spaced from the outer surface of the tubular portion 56.

Figure 8:
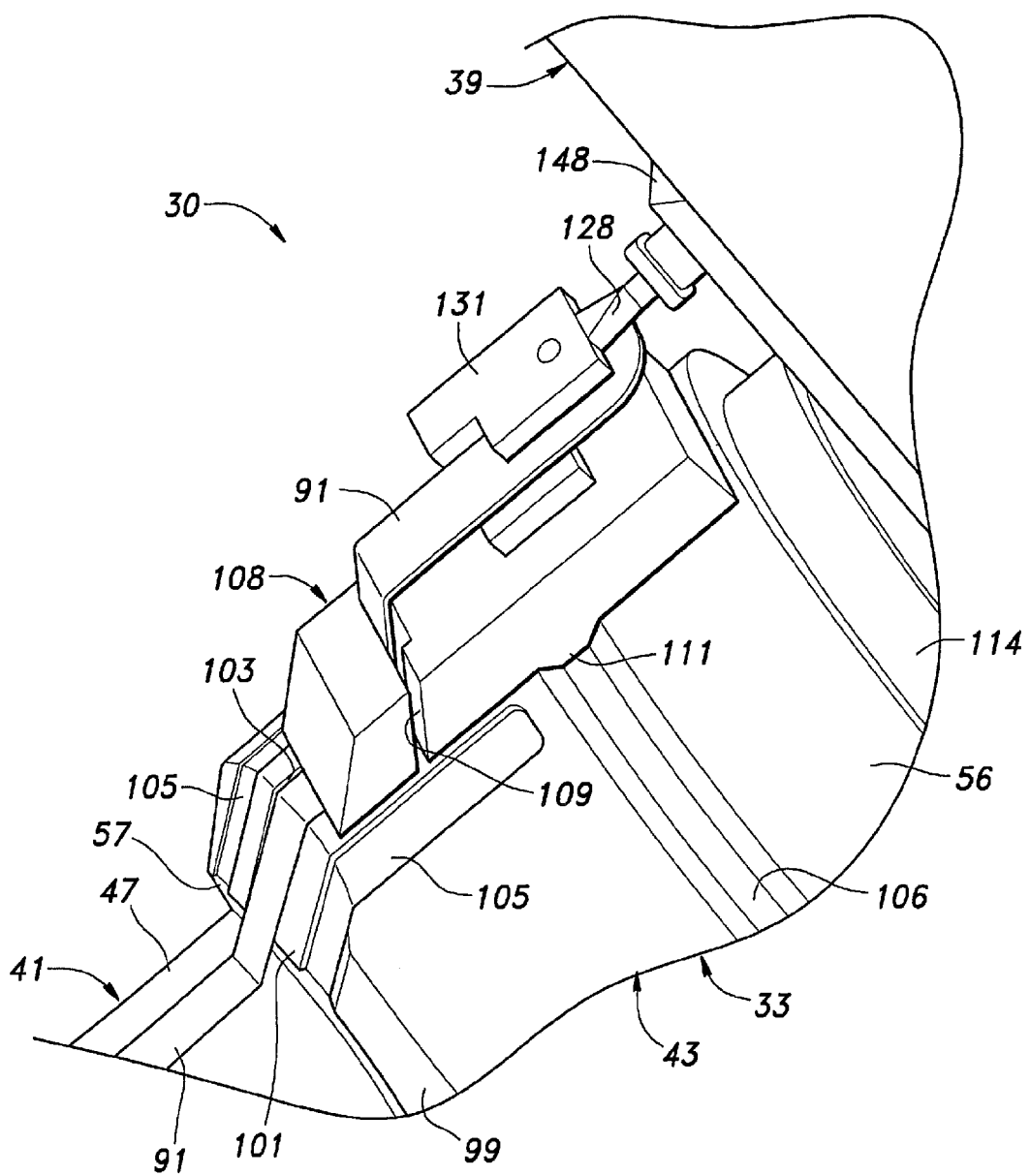
FIG. 8 is a perspective view of the wiring structure for the first and second sensor wire.

FIG. 8 is a perspective view of the wiring arrangement for the first and second sensor wires. As shown in FIGS. 5 and 8, the base end of the first sensor wire 91 is supported by a stay member 108 at a prescribed distance from the valve body 33. The stay member 108 consists of a plate member having a slit 109 in a middle part thereof and a projection 111 at a bottom end thereof. The base end of the first sensor wire 91 is passed into the slit 109, and the stay member 108 is bonded to the outer surface of the tubular portion 56. The stay member 108 can be axially positioned relative to the tubular portion 56 by the projection 111 projecting into and being engaged by the second engagement groove 106. The base end of the first sensor wire 91 projects out of the slit 109 of the stay member 108, and is supported in this condition.

Figure 9:
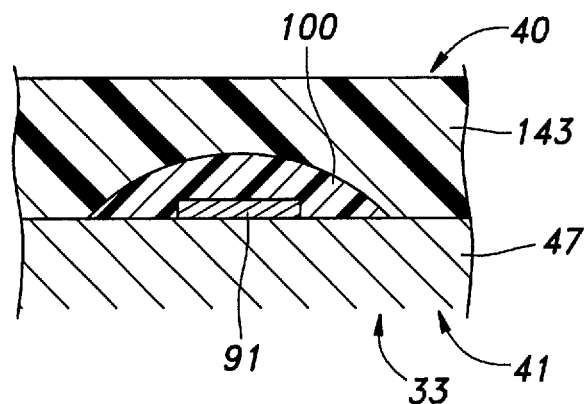
FIG. 9 is the wiring structure for the first sensor wire, (A) showing the first sensor wire positioned on the exterior of the large diameter portion, and (B) showing the first sensor wire positioned in the first receiving groove of the small diameter portion.
Figure 9:
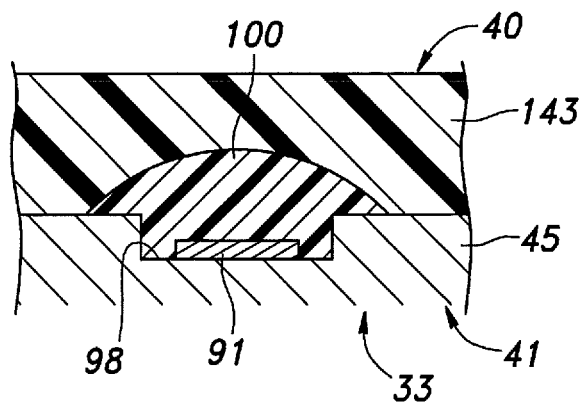

The first sensor wire 91 is stamp formed in a prescribed shape conforming to the profile of the valve body 33, the first receiving groove 98 and the second receiving groove 103 such that the first sensor wire 91 extends along the outer contour of the valve body 33. FIG. 9 is a sectional view showing the wiring arrangement for the first sensor wire 91, (A) showing the wiring arrangement on the exterior of the large diameter portion and (B) showing the wiring arrangement in the first receiving groove of the small diameter portion. As shown in FIGS. 9(A) and 9(B), except for the base end of the first sensor wire 91 that projects from the stay member 108, the first sensor wire 91 is covered by an epoxy or other bonding agent 100, and thereby bonded to the surface of the valve body 33. As shown in FIG. 9(A), in parts where the first receiving groove 98 and the second receiving groove 103 are absent, the first sensor wire 91 is covered by the bonding agent 100, and thereby bonded to the surface of the large diameter portion 47, for instance. As shown in FIG. 9(B), in parts where the first receiving groove 98 (the second receiving groove 103) is present, the first sensor wire 91 is buried in and covered by the bonding agent 100 that fills the first receiving groove 98. The bonding agent 100 is also applied such that the gap between the base end of the collar member 93 and the small diameter portion 45 is sealed.

As shown in FIGS. 2, 5 and 7, the first resin portion 39 is molded on the outer surface of the shaft portion 51. The first resin portion 39 includes a cylindrical base portion 114 which covers the part of the shaft portion 51 ranging from the flange 52 to the base end thereof. The free end side of the base portion 114 of the first resin portion 39 is increased in diameter to fill the annular space defined by the tubular portion 56, the flange 52 and the shaft portion 51. The part of the base end of the outer circumference of the shaft portion 51 located more forwardly than the O ring groove 85 is formed with an annular third engagement groove 116. The part of the inner circumference of the tubular portion 56 located more rearwardly than (on the open end side of) the flange 52 is formed with an annular fourth engagement groove 118. The base portion 114 of the first resin portion 39 is pushed into the third and fourth engagement grooves 116 and 118, and engaged thereby so that the first resin portion 39 is fixedly secured to the valve body 33 against an axial movement thereof.

Figure 11:
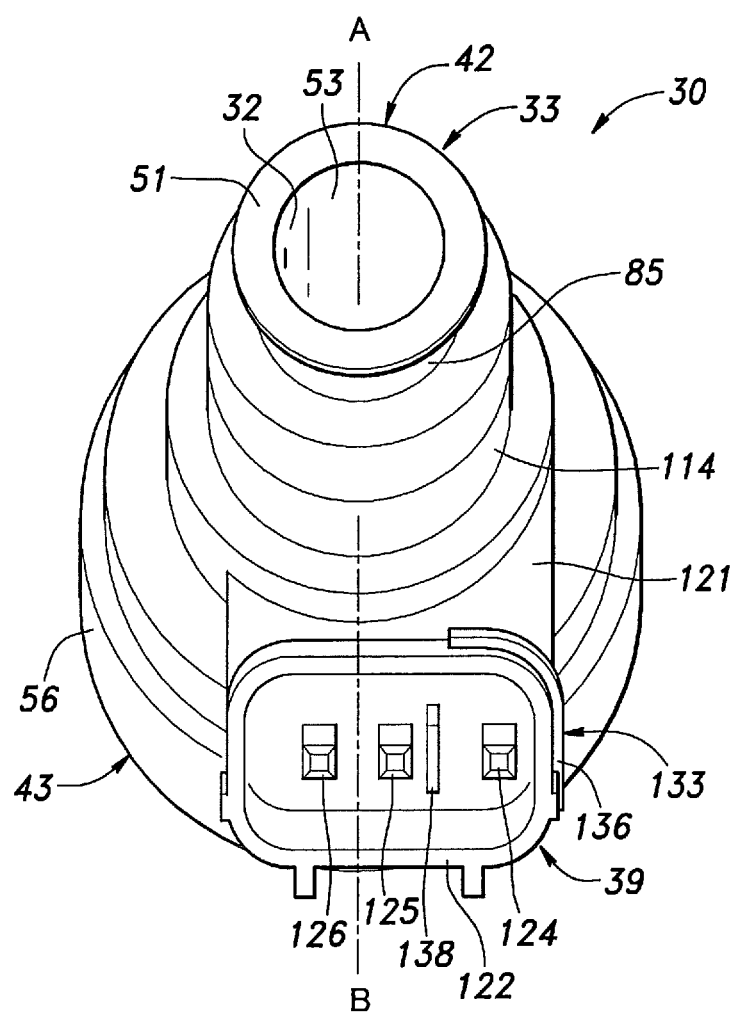
FIG. 11 is a perspective view similar to FIG. 4 showing a fuel injection valve given as a modification of the first embodiment.

The first resin portion 39 includes a connector portion 120 projecting sideways from the base portion 114. The connector portion 120 includes a wall portion 121 extending radially along a plane perpendicular to the axial line, and a tubular engagement portion 122 extending axially from the free end of the wall portion 121 to the side of the base end. As shown in FIG. 4, the center of the wall portion 121 and the engagement portion 122 is offset sideways with respect to the radial line B extending parallel to the projecting direction of the wall portion 121. In other words, the connector portion 120 is offset from the axial line A. The engagement portion 122 is internally provided with a sensor connecting terminal (first connecting terminal) 124, a first and a second solenoid connecting terminal (second connecting terminals) 125 and 126. The first solenoid connecting terminal 125 is placed in the center of the engagement portion 122, and the second solenoid connecting terminal 126 is located on the other side of the radial line B with respect to the first solenoid connecting terminal 125. The sensor connecting terminal 124 is located on the other side of the first solenoid connecting terminal 125 with respect to the second solenoid connecting terminal 126. It is preferred that the sensor connecting terminal 124 is placed on the other side of the first solenoid connecting terminal 125 with respect to the second solenoid connecting terminal 126 at some distance away from them. FIG. 11 is a perspective view similar to FIG. 4 showing a fuel injection device given as a modification of the first embodiment. As shown in FIG. 11, the sensor connecting terminal 124 is desired to be spaced away from the first and second solenoid connecting terminals 125 and 126 as much as possible. The distance between the sensor connecting terminal 124 and the first solenoid connecting terminal 125 is greater than the distance between the first solenoid connecting terminal 125 and the second solenoid connecting terminal 126.

The first solenoid wire (drive signal transmitting member) 83 is connected to the first solenoid connecting terminal 125, and the second solenoid wire (drive signal transmitting member) 84 is connected to the second solenoid connecting terminal 126. The first and second solenoid wires 83 and 84 are passed into the base portion 114 of the first resin portion 39 via the through holes 89 of the flange 52, and then into the wall portion 121 via the base portion 114. The first and second solenoid wires 83 and 84 extend in the radial direction in the wall portion 121, and enter the engagement portion 122. The first and second solenoid wires 83 and 84 are split from each other in the engagement portion 122, and are connected to the first and second solenoid connecting terminals 125 and 126, respectively.

An end of the second sensor wire 128 is connected to the sensor connecting terminal 124. The second sensor wire 128 is passed through the engagement portion 122 and the wall portion 121, and extends out of a free end surface 129 of the wall portion 121 facing the free end side. Preferably, the second sensor wire 128 is spaced from the first and second solenoid wires 83 and 84 in the engagement portion 122 and the wall portion 121. The other end of the second sensor wire 128 projecting from the free end surface 129 is connected to a clip 131 consisting of an electro-conductive metallic piece bent in a hair-pin shape by soldering or any other known method. The base end of the first sensor wire 91 is engaged by the clip 131, and is electrically connected thereto by soldering or any other known method.

Figure 10:
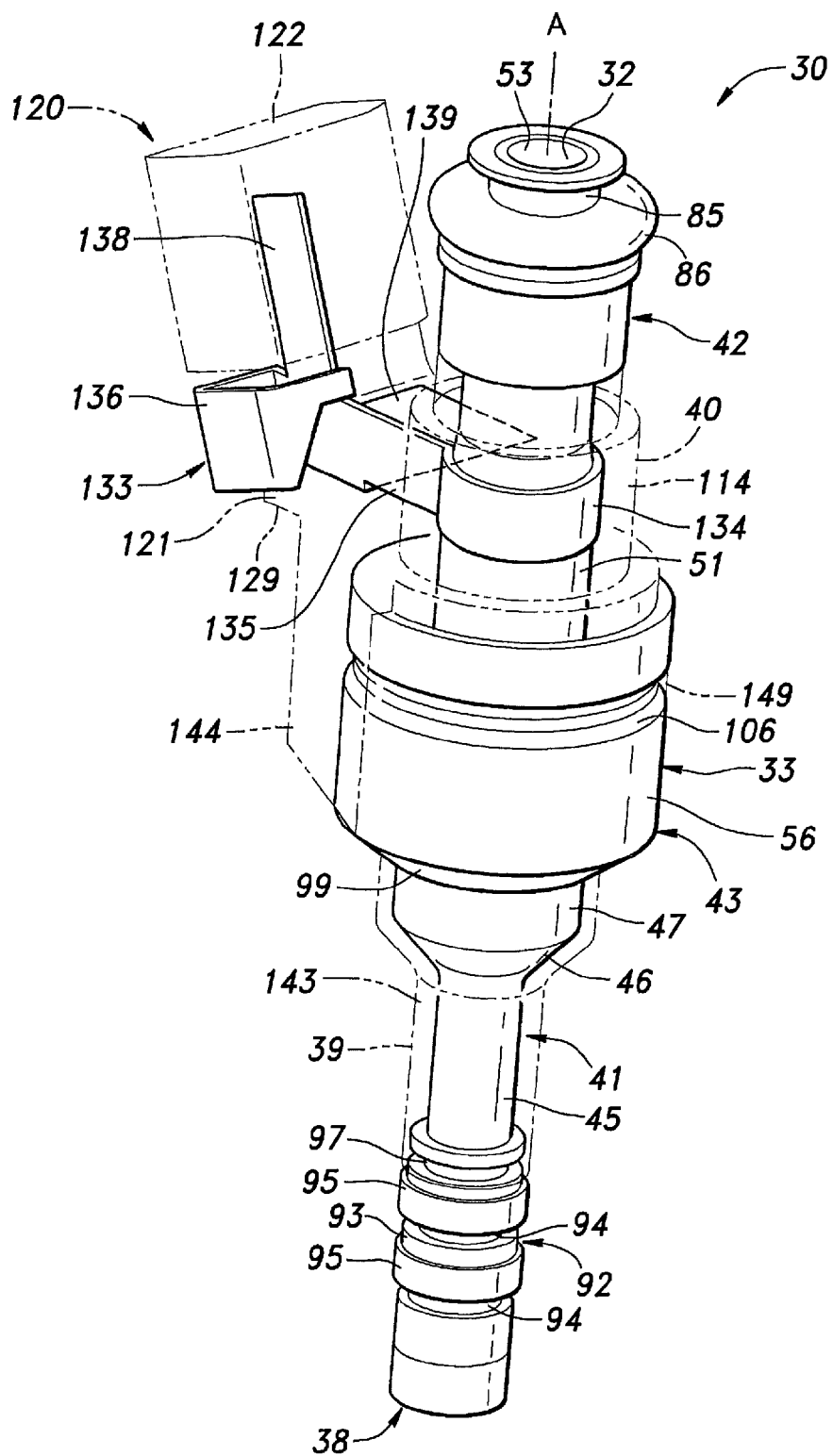
FIG. 10 is a perspective view of the fuel injection device (with the shield cover removed, and with the first and second resin portions showing through)

FIG. 10 is a perspective view of the fuel injection device (with the shield cover removed, and with the first and second resin portions showing through). As shown in FIGS. 2, 5 and 10, the second sensor wire 128 is surrounded by a shield member 133 that shields electro-magnetic noises. The shield member 133 consists of an electro-conductive metallic plate piece including a grounding portion 134 at an end thereof wrapped around the shaft portion 51 and electrically connected thereto. The shield member 133 further includes a trunk portion 135 that extends linearly from the grounding portion 134 into the connector portion 120 toward the projecting end thereof. The trunk portion 135 extends within the base portion 114 into the wall portion 121 along the first and second solenoid wires 83 and 84, and projects out of the projecting end of the wall portion 121 after passing through the gap by which the second sensor wire 128 is separated from the first and second solenoid wires 83 and 84 in the wall portion 121. The trunk portion 135 is provided with a certain width in the axial direction so as to divide the wall portion 121 into two parts.

The free end of the trunk portion 135 projecting from the projecting end of the wall portion 121 is provided with an annular portion 136 which is bent so as to extend along the outer surface of the wall portion 121 and surround the second sensor wire 128. The part of the trunk portion 135 located in the wall portion 121 is bifurcated into a first branch portion 138 and a second branch portion 139. As shown in FIG. 4, the first branch portion 138 consisting of a plate member extends from the projecting end of the trunk portion 135 into the engagement portion 122, and projects out of the gap between the first solenoid connecting terminal 125 and the sensor connecting terminal 124. As shown in FIG. 10, the first branch portion 138 extends between the first solenoid wire 83 and the second sensor wire 128. The second branch portion 139 also consisting of a plate member extends from the base end portion of the trunk portion 135 located in the wall portion 121 inside the free end surface 129 in parallel with the free end surface 129. The second branch portion 139 is positioned so as to cover the base ends of the first and second solenoid wires 83 and 84.

The shield member 133, the first and second solenoid wires 83 and 84, the second sensor wire 128, the first and second solenoid connecting terminals 125 and 126 and the sensor connecting terminal 124 are at least partly buried in the first resin portion 39 by insert molding.

As shown in FIGS. 2 and 5, the second resin portion 40 is molded on the exterior of the first body 41, the second body 42 and the first resin portion 39. The second resin portion 40 includes a first part 143 covering the first body 41 and a second part 144 covering the second body 42 and a side of the base portion 114 of the first resin portion 39.

The first part 143 is provided with a tubular shape so as to cover the part of the small diameter portion 45 of the first body 41 on the base end side of the collar member 93, the tapered portion 46, the large diameter portion 47 and the interface between the large diameter portion 47 and the end wall 57 of the second body 42. The first part 143 covers the first receiving groove 98 having the first sensor wire 91 placed therein. As shown in FIG. 6, the end surface of the base end of the collar member 93 contacting the first part 143 is formed with a fifth engagement groove 146 consisting of an annular groove extending circumferentially. The free end of the first part 143 is in contact with the base end surface of the collar member 93, and extends into the fifth engagement groove 146 to be engaged thereby. As shown in FIGS. 2 and 5, the base end of the first part 143 engages the outer surface of the end wall 57 of the second body 42, and defines a tapering outer circumferential surface smoothly connected to the tapered surface 99.

The second part 144 extends in the axial direction (defined by the axial line A) so as to cover the second receiving groove 103 and the first engagement grooves 105 as shown in FIG. 7. The free end of the second part 144 extends so as to cover the recess 101 toward the free end, and smoothly continues with the first part 143. The base end of the second part 144 extends so as to contact a side portion of the first resin portion 39 opposing the shaft portion 51 and the free end surface of the wall portion 121, and covers the base end of the first sensor wire 91, the stay member 108, the clip 131 and the second sensor wire 128 that protrudes from the wall portion 121.

As shown in FIG. 7, the free end surface 129 of the wall portion 121 is formed with an engagement projection 148 projecting forward. The engagement projection 148 is provided with a progressively increasing width toward the free end. In particular, the engagement projection 148 of the first embodiment is provided with a rectangular cross section with a progressively increasing area toward the free end. The width of the engagement projection 148 may either increase continually or increase in a stepwise manner toward the free end. The second sensor wire 128 projects from the free end surface of the engagement projection 148. The second part 144 of the second resin portion 40 is molded onto the engagement projection 148 so as to wrap around the engagement projection 148. As shown in FIG. 2, the second part 144 extends in the second engagement groove 106 along the length thereof, thereby defining an annular ring portion 149. By being engaged by the second engagement groove 106, the ring portion 149 effectively prevents the second part 144 from being dislodged from the second body 42.

As shown in FIG. 3, the wall portion 121 of the first resin portion 39 and the second part 144 of the second resin portion 40 are covered by an electro-conductive shield cover 150 which is attached to the annular portion 136 of the shield member 133 by welding. Thereby, the shield cover 150 is electrically connected to the shield member 133.

The fuel injection device 30 having the structure discussed above is mounted on the engine such that the first body 41 is located in the injector hole 19 and the third body 43 is located outside the injector hole 19 as shown in FIGS. 1 and 5. An annular tolerance ring 152 is placed on the mounting seat 21 provided on the outer end of the injector hole 19 in a coaxial relationship to the injector hole 19. The tolerance ring 152 is provided with an electro-conductivity, and is provided with a tapered surface on the inner circumference thereof in conformity with the tapered surface 99 of the third body 43. Thereby, the valve body 33 is electrically connected to the cylinder head 3 via the tolerance ring 152, and is thereby grounded.

The free end of the first body 41 provided with the nozzle member 34 and the sensor 38 is exposed in the combustion chamber 7. The seal device 92 seals the interface between the injector hole 19 and the valve body 33 by causing each gas seal member 95 to be in contact with the inner circumferential surface of the injector hole 19. As shown in FIG. 1, the base end of the shaft portion 51 forming the base end part of the valve body 33 is fitted into and connected to a connecting tube 161 provided in a delivery pipe 160 for supplying fuel to the fuel injection device 30. The O ring 86 seals the interface between the shaft portion 51 and the connecting tube 161 as discussed earlier. Thereby, the fuel drawn from the delivery pipe 160 may be supplied to the fuel passage 32 consisting of the first hole 48 and the second hole 53 via the connecting tube 161.

A connector (not shown in the drawings) of a wire harness extending from an ECU for controlling the fuel injection device 30 is connected to the connector portion 120. Thereby, the sensor connecting terminal 124 and the first and second solenoid connecting terminals 125 and 126 are connected to the ECU via the wire harness so that the sensor signal from the sensor 38 is transmitted to the ECU, and the drive signal is transmitted from the ECU to the first and second solenoid wires 83 and 84.

When the drive signal (voltage) is supplied to the solenoid 37 via the first and second solenoid wires 83 and 84, a corresponding electromagnetic field is generated by the solenoid 37. The magnetic field is conducted by a magnetic circuit formed by the free end of the shaft portion 51 of the second body 42, the enlarged diameter portion 77 of the valve member 35, the tubular portion 56 and the end wall 57 of the third body 43, and the base end of the first body 41. The shaft portion 51 of the second body 42 serves as a yoke (fixed iron core), and the enlarged diameter portion 77 serves as an armature (moveable iron core) such that the enlarged diameter portion 77 is attracted to the shaft portion 51 against the biasing force of the first spring 79. Thereby, the free end of the rod 76 of the valve member 35 is displaced from the valve seat 64 of the nozzle member 34, causing the fuel to be injected from the injection orifices 65 into the combustion chamber 7. When the supply of the drive signal to the solenoid 37 is stopped, the attractive force between the enlarged diameter portion 77 and the shaft portion 51 is lost so that the valve member 35 is caused to be moved toward the free end thereof under the biasing force of the first spring 79, and the free end of the rod 76 closes the injection orifices 65 by seating on the valve seat 64 of the nozzle member 34. As a result, the injection of fuel is terminated.

The advantages of the fuel injection device 30 having the structure discussed above are discussed in the following. As the first and second solenoid connecting terminals 125 and 126, and the sensor connecting terminal 124 of the fuel injection device 30 are provided in the same connector portion 120, the configuration of the fuel injection device 30 can be simplified, and the connection to an external circuit can be simplified.

Because the first and second sensor wires 91 and 128 that connect the sensor 38 supported by the free end of the valve body 33 to the sensor connecting terminal 124 are placed on the exterior of the valve body 33, the internal structure of the valve body 33 is not required to be changed to accommodate the first and second sensor wires 91 and 128 therein. Therefore, the fuel injection device 30 fitted with a sensor 38 and the fuel injection device 30 not fitted with a sensor 38 can use a same valve body 33.

When the first and second sensor wires 91 and 128 are made of flexible printed circuit boards, and are thin enough to be placed along the outer contour of the valve body 33, the overall size of the fuel injection device 30 is not required to be increased owning to the presence of the first and second sensor wires 91 and 128. Because the first and second sensor wires 91 and 128 are covered by the bonding agent 100, these wires are fixed in position. Therefore, even when the fuel injection device 30 is subjected to vibrations owing to the repeated movement of the valve member 35, the first and second sensor wires 91 and 128 are prevented from moving so that the signal transmitted by the first and second sensor wires 91 and 128 is not contaminated by noises.

Because the first sensor wire 91 is fixedly secured to the valve body 33 by the bonding agent 100 and the stay member 108 before the second resin portion 40 is molded, the first sensor wire 91 is allowed to maintain the prescribed position when subjected to the pressure at the time of injection molding the second resin portion 40. Therefore, the first sensor wire 91 can be kept at the prescribed position in the second resin portion 40.

By being covered by the first and second resin portions 39 and 40, the first and second sensor wires 91 and 128 are prevented from contact with rainwater and other moisture. Because the first sensor wire 91, and the connecting point between the first sensor wire 91 and the second sensor wire 128 are covered not only by the second resin portion 40 but also by the bonding agent 100, the contact with moisture can be prevented even more effectively. The interface between the first resin portion 39 and the second body 42 and the interface between the first resin portion 39 and the third body 43 are protected from the intrusion of moisture because the first resin portion 39 is filled into the third engagement groove 116 and the fourth engagement groove 118 so as to form an interlocking engagement. Likewise, the interface between the second resin portion 40 and the first body 41 and the interface between the second resin portion 40 and the third body 43 are protected from the intrusion of moisture because the second resin portion 40 is filled into the first engagement grooves 105, the second engagement groove 106 and the fifth engagement groove 146 so as to form an interlocking engagement. Also, because the second resin portion 40 is wrapped around the engagement projection 148 of the first resin portion 39, and interlocking features may be provided in the interface between the first resin portion 39 and the second resin portion 40, the intrusion of moisture into this interface is effectively prevented.

The shield member 133 functions as an electromagnetic shield for containing the electromagnetic field generated by the drive signal transmitted through the first and second solenoid wires 83 and 84 so that the sensor signal transmitted by the first and second sensor wires 91 and 128 and the sensor connecting terminal 124 is protected from noises. As the shield member 133 is grounded by being connected to the cylinder head 3 via the valve body 33 and the tolerance ring 152 which are both electroconductive, the grounding structure can be simplified. The first branch portion 138 of the shield member 133 provides a shield between the sensor connecting terminal 124 and the first solenoid connecting terminal 125 in the engagement portion 122. The second branch portion 139 shields the free end of the first and second solenoid wires 83 and 84, and prevents the drive signal transmitted by the first and second solenoid wires 83 and 84 from interfering primarily with the sensor signal transmitted by the first sensor wire 91.

The shield cover 150 functions as an electromagnetic shield for preventing the electromagnetic field generated by the drive signal transmitted by the first and second solenoid wires 83 and 84 of other fuel injection devices 30 that are provided in conjunction with other combustion chambers 7 from interfering with the sensor signal transmitted by the first and second sensor wires 91 and 128 and the sensor connecting terminal 124. Because the annular portion 136 of the shield member 133 projects from the first resin portion 39 and electrically connected to the shield cover 150, the grounding structure for the shield cover 150 is simplified.

Because the sensor connecting terminal 124 is spaced apart from the first and second solenoid connecting terminals 125 and 126, the influences of the electromagnetic field generated by the first and second solenoid connecting terminals 125 and 126 on the sensor connecting terminal 124 can be minimized. Similarly, because the second sensor wire 128 connected to the sensor connecting terminal 124 is spaced apart from the first and second solenoid wires 83 and 84 connected to the first and second solenoid connecting terminals 125 and 126, respectively, the second sensor wire 128 is protected from the influences of the electromagnetic field generated by the first and second solenoid wires 83 and 84.

The first embodiment was directed to a fuel injection device using a solenoid as an actuator, but it is also possible to use a per se known piezoelectric device as an actuator. The cover member consisted of both the second resin portion 40 and the bonding agent 100 in the first embodiment, but only one of them may be used as the cover member. The sensor signal transmitting member included the first and second sensor wires that are connected to each other by the clip 131, but it is also possible to use a single continuous wire as the sensor signal transmitting member.

Second Embodiment

Figure 12:
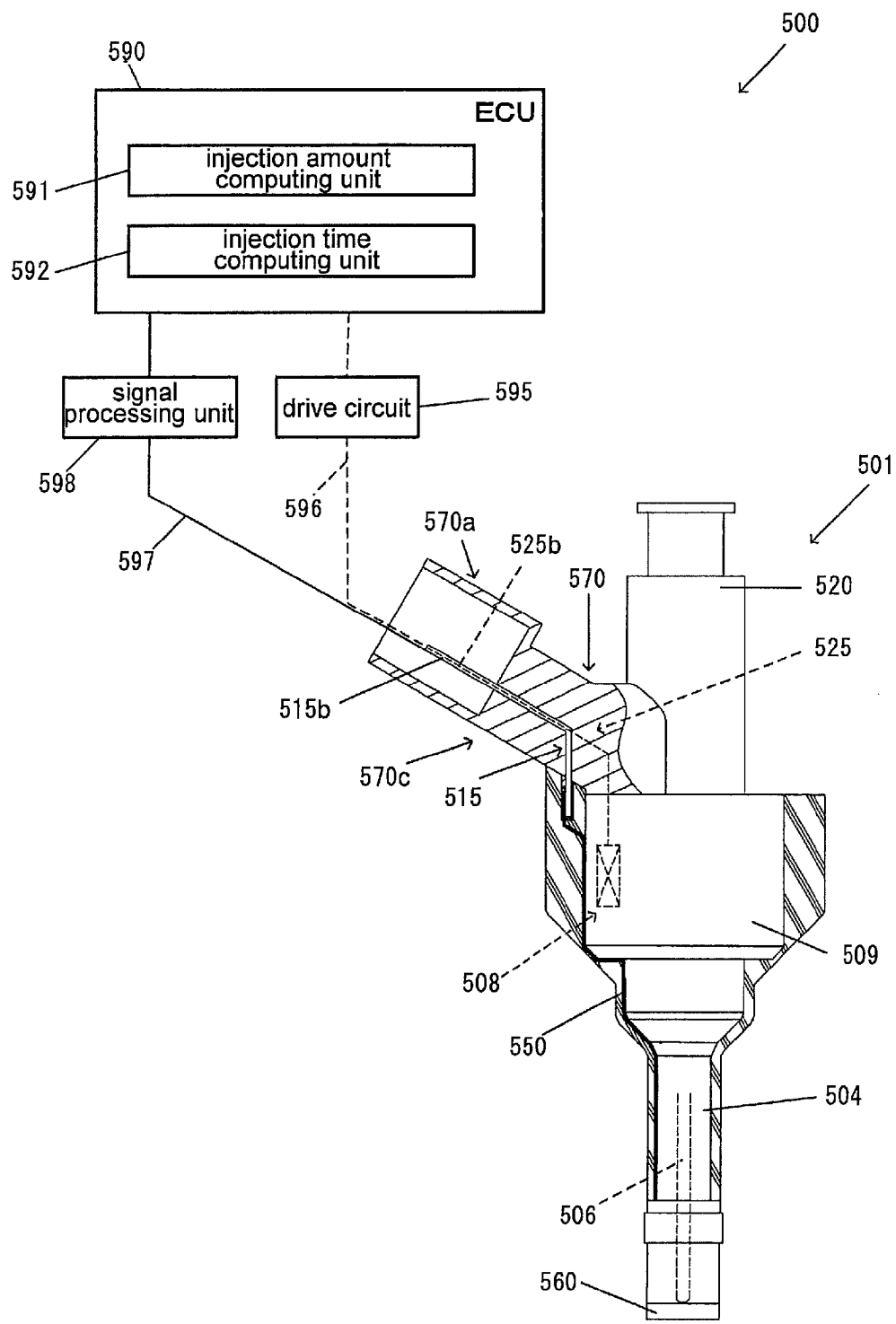
FIG. 12 is a block diagram showing the structure of the fuel injection valve.

A second embodiment of the fuel injection valve (device) according to the present invention is described in the following with reference to the appended drawings. FIG. 12 is a block diagram showing the fuel injection device 500 including a fuel injection valve 501 given as the second embodiment of the present invention. The fuel injection device 500 includes an ECU 590 serving as fuel injection control unit in addition to the fuel injection valve 501.

The ECU 590 receives information obtained from various sensors such as the engine rotational speed, the boost pressure, the intake air amount, the intake temperature, the cooling water temperature and the fuel pressure, and controls the fuel injection in an optimum fashion according to the state of the engine (internal combustion engine).

The ECU 590 includes an injection amount computing unit 591 for computing an optimum amount of fuel injection according to the received information, and an injection time computing unit 592 for computing an injection time according to the computation performed by the injection amount computing unit 591.

The information on the injection pulse width computed by the injection time computing unit 592 is forwarded to the drive circuit 595. The drive circuit 595 produces a drive current corresponding to the injection pulse width, and supplies the drive current to an electromagnetic coil 508 placed around a moveable valve member 506 of the fuel injection valve 501. Thereby, the moveable valve member 506 is opened under the magnetic attractive force, and maintains the open state for a time period corresponding to the injection pulse width before the moveable valve member 506 is closed once again. In other words, the fuel injection valve 501 is opened and closed by using the electromagnetic force of the electromagnetic coil 508.

In this embodiment, a pressure sensor 560 is provided on the free end of the fuel injection valve 501 to detect the pressure in the cylinder. The signal produced from the pressure sensor 560 is forwarded to the ECU 590 via a signal processing unit 598. The signal processing unit 598 performs an analog to digital conversion process on the signal obtained from the pressure sensor 560.

Figure 13:
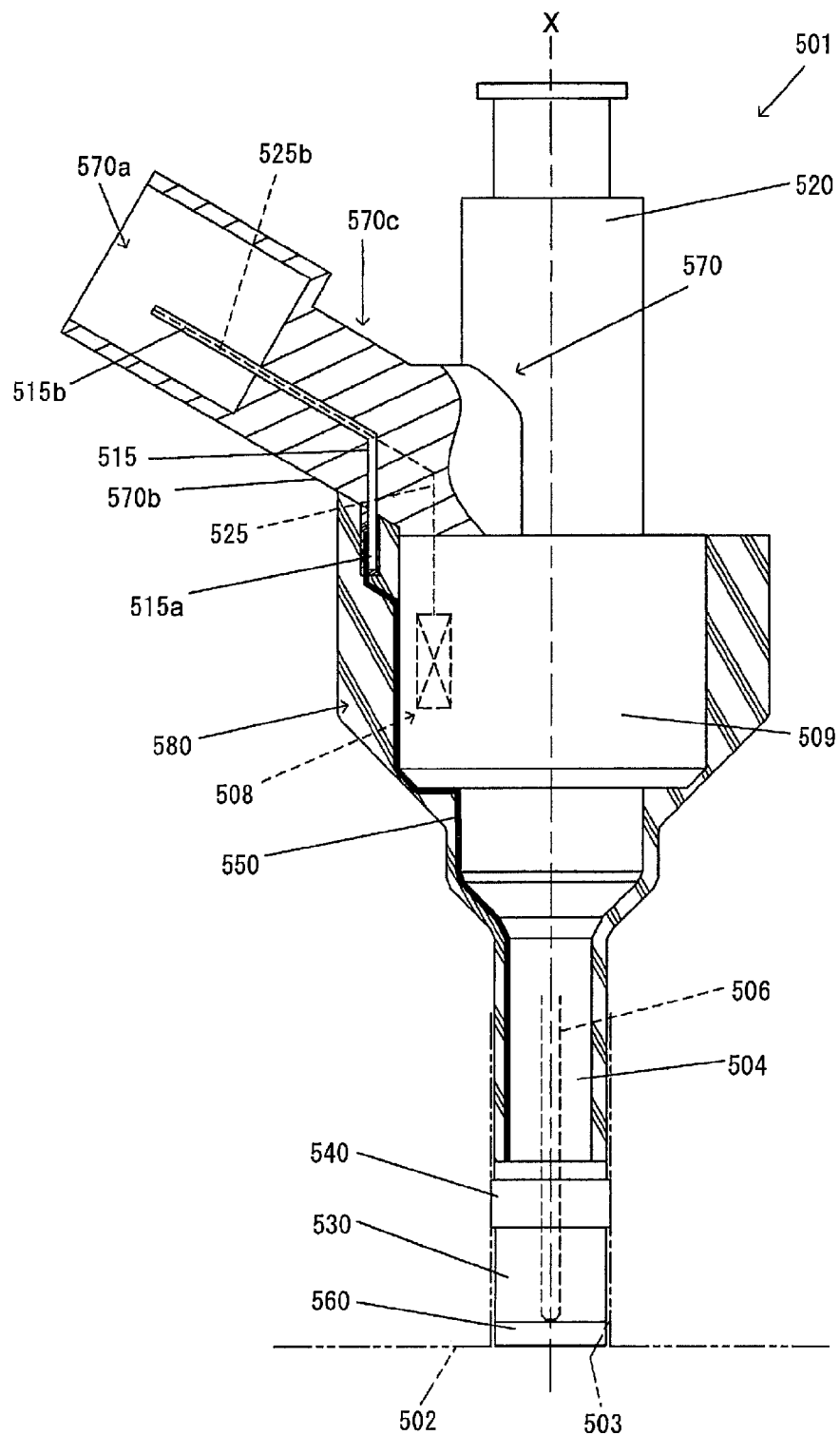
FIG. 13 is a side view of a fuel injection valve shown partly in section.
Figure 14:
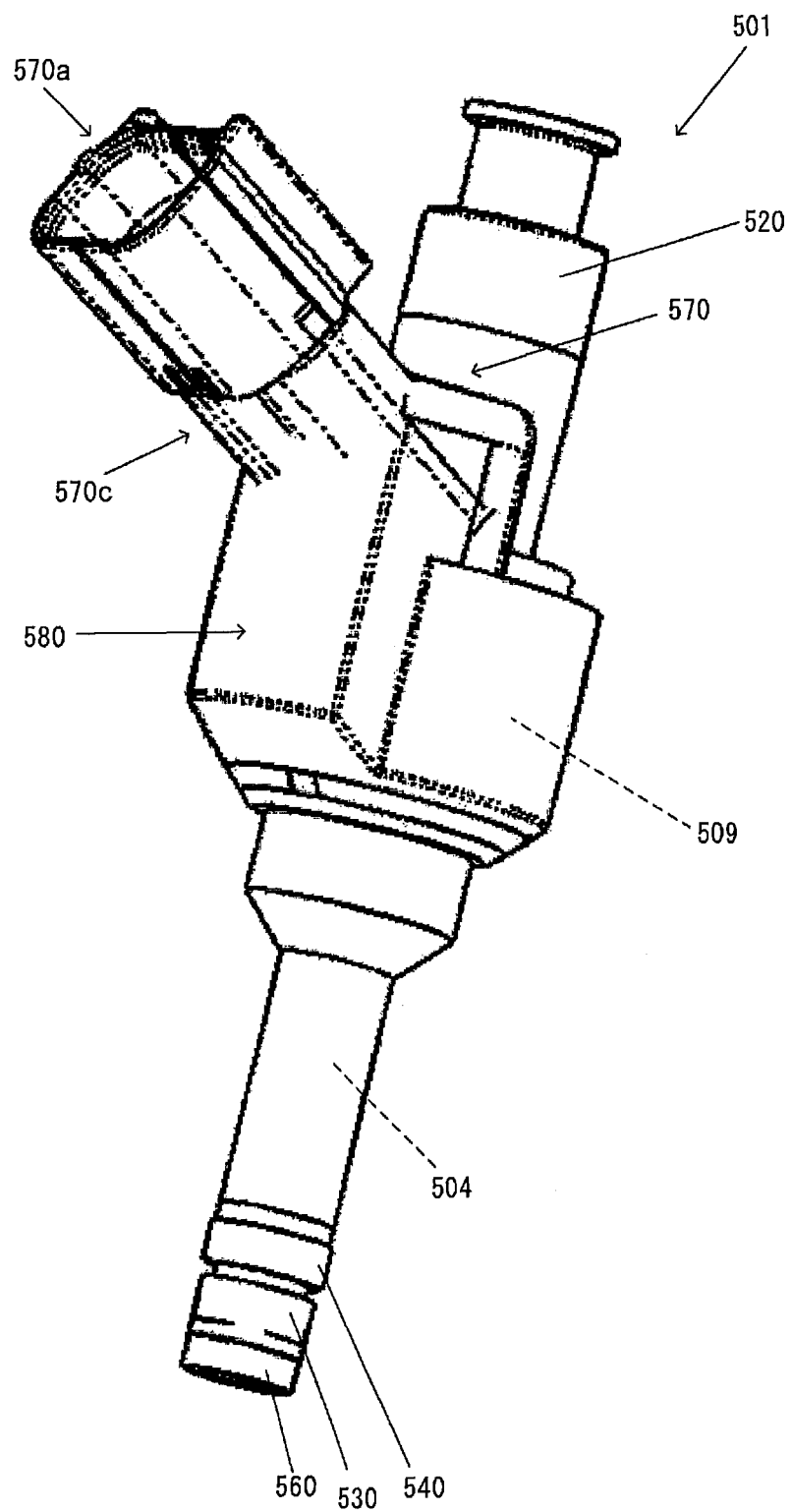
FIG. 14 is an external perspective view of the fuel injection valve given as a second embodiment.

Referring to FIGS. 13 and 14, the structure of the fuel injection valve 501 is described in the following. FIG. 13 is a side view of the fuel injection valve 501 shown partly in section, and FIG. 14 is an external perspective view of the fuel injection valve. The fuel injection valve 501 consists of a solenoid actuated fuel injection valve configured to directly inject fuel into the cylinder of the gasoline engine. The fuel injection valve 501 includes a housing (yoke) 509 and a nozzle member 504 including a part which is press fitted into the housing 509. The housing 509 further includes an elongated hollow cylindrical core 520 provided in a lower part thereof and internally defining a fuel passage. The housing 509 is internally provided with an electromagnetic coil 508 which surrounds the core 520.

As shown in FIG. 13, the moveable valve member 506 is positioned in the nozzle member 504 in a coaxial relationship with the central axial line (central axial line X) of the fuel injection valve 501. When the energizing current is supplied to the electromagnetic coil 508, the resulting magnetic attractive force causes the moveable valve member 506 to move upwardly in the drawing along the central axial line X, thereby opening the fuel injection valve 501.

The part of the core 520 protruding from the housing 509 is formed with a connector mold member (resin mold member) 570 on an outer peripheral part thereof by a per se known injection molding process. A part of the connector mold member 570 extends obliquely upward from the housing 509 as seen in the drawing, and a free end thereof is formed into a connector portion 570*a*.

The connector mold member 570 retains a pair of energization current external terminals 525 and a sensor external terminal 515 in a mutually insulated condition. As shown in FIG. 12, an end of each energization current external terminal 525 is formed as an energization current connecting terminal 525*b* which is connected to a wire 596 for supplying the energization current to the electromagnetic coil 508, and positioned in the connector portion 570*a* (See FIG. 17).

Figure 17:
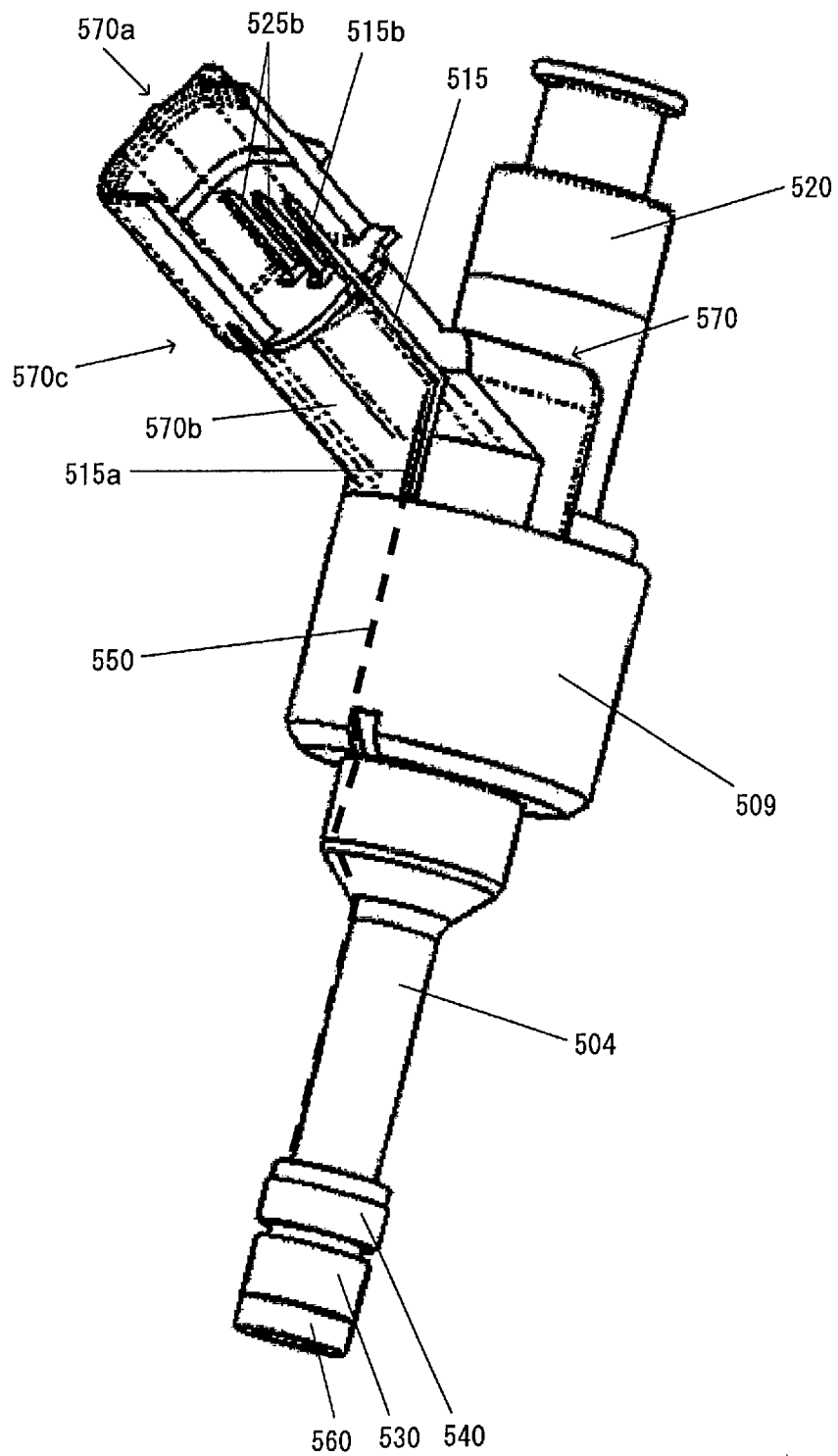
FIG. 17 is a partly broken away external perspective view of the fuel injection valve after the secondary mold member has been molded thereto.

An end of the sensor external terminal 515 is connected to a wire 597 for obtaining the detection signal of the pressure sensor 560, and is positioned in the connector portion 570*a* (See FIG. 17).

As shown in FIG. 13, the pressure sensor 560 for detecting the pressure in the cylinder is fixedly attached to the free end of the nozzle member 504. A signal wire 550 is connected to the pressure sensor 560. The signal wire 550 consists of a conductor wire which is covered by a sheath member except for an electric connecting parts thereof, and is connected to the pressure sensor 560 at an end thereof and to the sensor external terminal 515 at the other end thereof. The detection signal obtained by the pressure sensor 560 is supplied to the ECU 590 via the signal wire 550, the sensor external terminal 515 and the wire 597. The signal wire 550 extends along the outer surface of the housing 509 and the nozzle member 504 (See FIGS. 13 and 16). The signal wire 550 is fixedly attached to the outer surface of the housing 509 and the nozzle member 504 by using a bonding agent or the like, and is covered by a secondary mold member 580 along with the housing 509 and the nozzle member 504.

Figure 15:
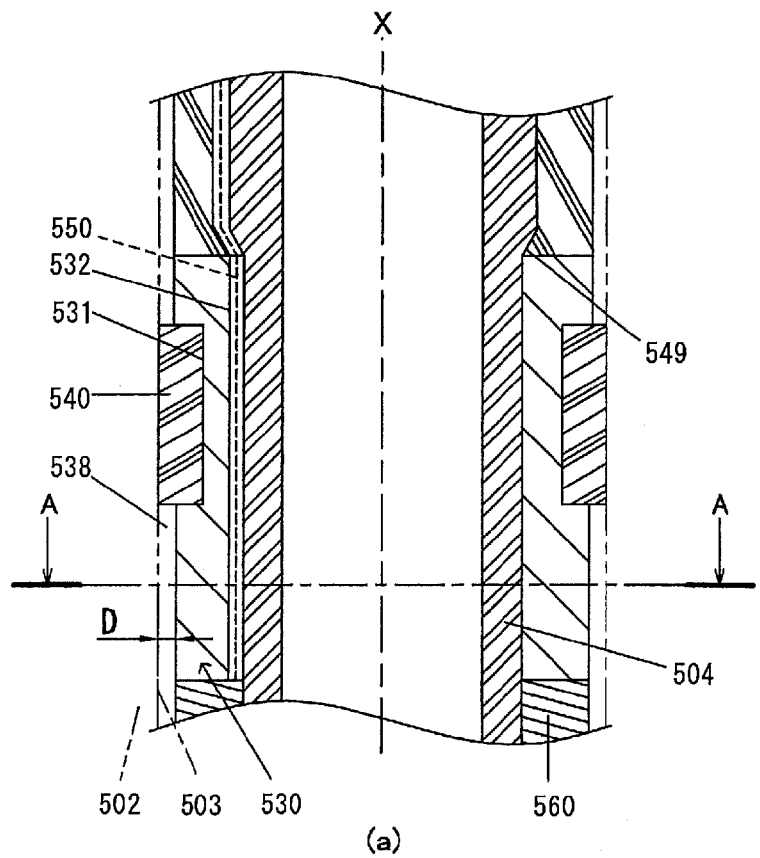
FIG. 15(*a*) is a fragmentary sectional view of a free end part of the nozzle member, and FIG. 15(*b*) is a sectional view taken along line A-A.
Figure 15:
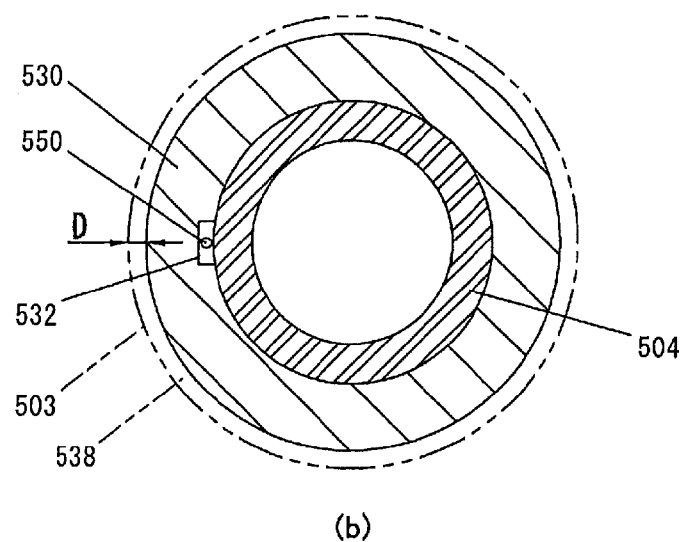

As shown FIGS. 13 and 14, a tip seal holder 530 retaining a tip seal 540 is provided in a part of the housing 509 adjacent to the nozzle member 504. Referring to FIG. 15, the tip seal holder 530 provided adjacent to the nozzle member 504 is described in the following. FIG. 15(*a*) is a schematic sectional view showing the free end part of the nozzle member 504, and FIG. 15(*c*) is a sectional view taken along line A-A of FIG. 15(*a*).

The tip seal holder 530 consists of a cylindrical member coaxially disposed to the central axial line X of the fuel injection valve 501. The outer circumferential surface of the tip seal holder 530 is provided with a groove 531 extending in the circumferential direction. As shown in FIG. 15(*a*), a tip seal 540 consisting of an annular seal member is fitted into the groove 531.

The tip seal holder 530 is press fitted into an end of the nozzle member 504, and is laser welded thereto at prescribed positions. In the illustrated embodiment, the nozzle member 504 is enlarged in diameter at a part thereof spaced from the free end thereof by a prescribed distance, thereby defining a stepped portion 549. The stepped portion 549 engages an end of the tip seal holder 530. The stepped portion 549 is provided for the positioning of the tip seal holder 530. When assembling the tip seal holder 530 to the nozzle member 504, the tip seal holder 530 is press fitted onto the nozzle member 504 until an end of the tip seal holder 530 is engaged by the stepped portion 549 so that the positioning of the tip seal holder 530 is simplified.

As shown in FIGS. 13 and 15, an injector hole 503 is formed in the cylinder head 502. When the nozzle member 504 of the fuel injection valve 501 is passed into the injector hole 503, the interface between the inner circumferential surface of the injector hole 503 and the outer circumferential surface of the tip seal holder 530 is sealed by the tip seal 540.

As shown in FIG. 15, the dimension D of the gap 538 between the inner circumferential surface of the injector hole 503 and the outer circumferential surface of the tip seal holder 530 is determined to be about 0.2 mm. By limiting the dimension D of the gap 538 to be no more than the prescribed dimension, the melting of the tip seal 540 owing to the direct contact with the high temperature combustion gas can be avoided.

An insertion groove 532 is formed in the inner circumferential surface of the tip seal holder 530 along the central axial line X. The signal wire 550 of the pressure sensor 560 is received in the space defined by the insertion groove 532 and the outer circumferential surface of the nozzle member 504.

The signal wire 550 extends from the pressure sensor 560 to a projecting part 570c of the connector mold member 570 via the insertion groove 532 and the outer surfaces of the nozzle member 504 and the housing 509 as shown in FIG. 13. The signal wire 550 extends into a sloped portion 570b of the projecting part 570c which faces the side of the pressure sensor 560, and is connected to a projecting part 515a of the sensor external terminal 515 projecting toward the pressure sensor 560.

Figure 16:
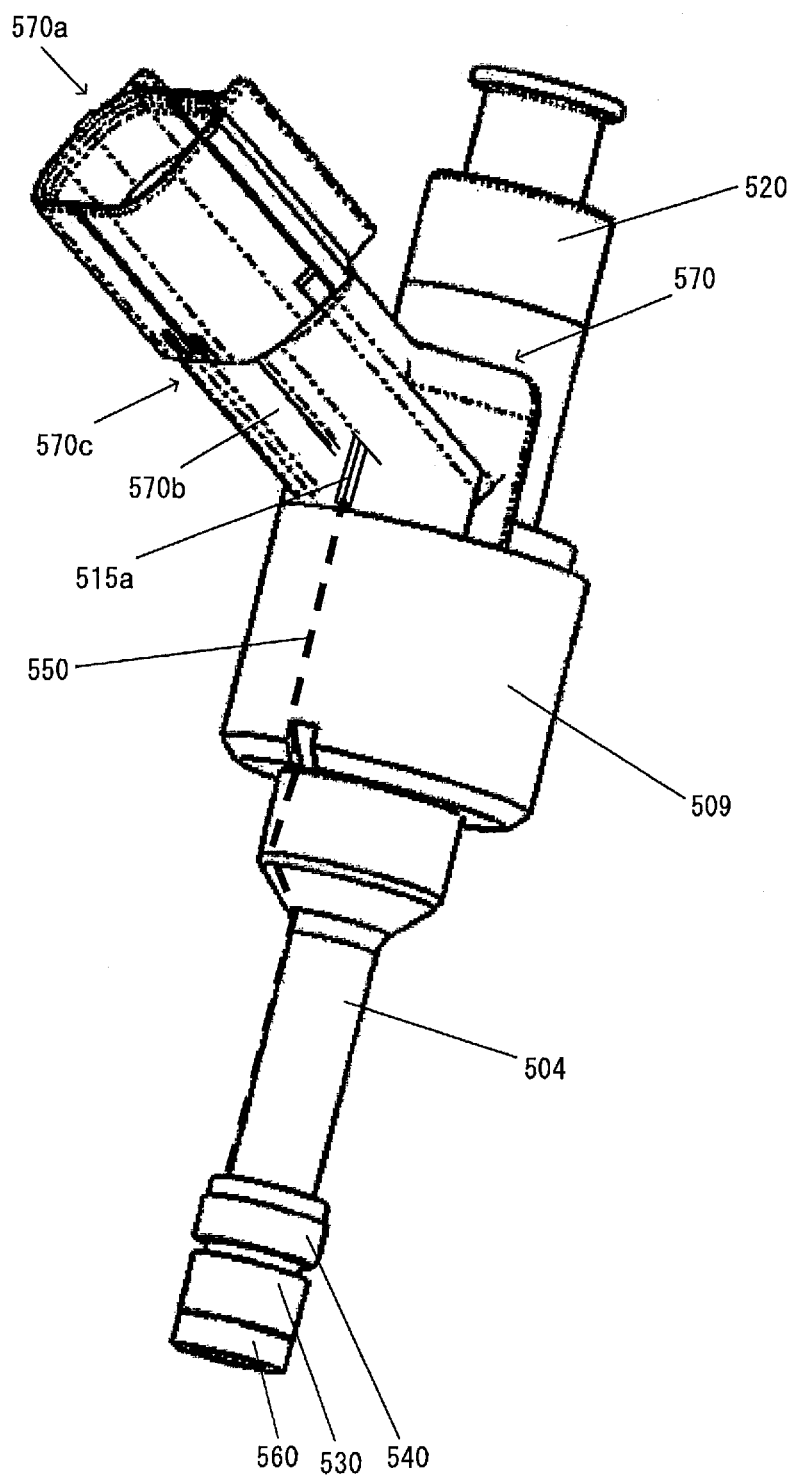
FIG. 16 is an external perspective view of the fuel injection valve before the secondary mold member is molded thereto.
Figure 18:
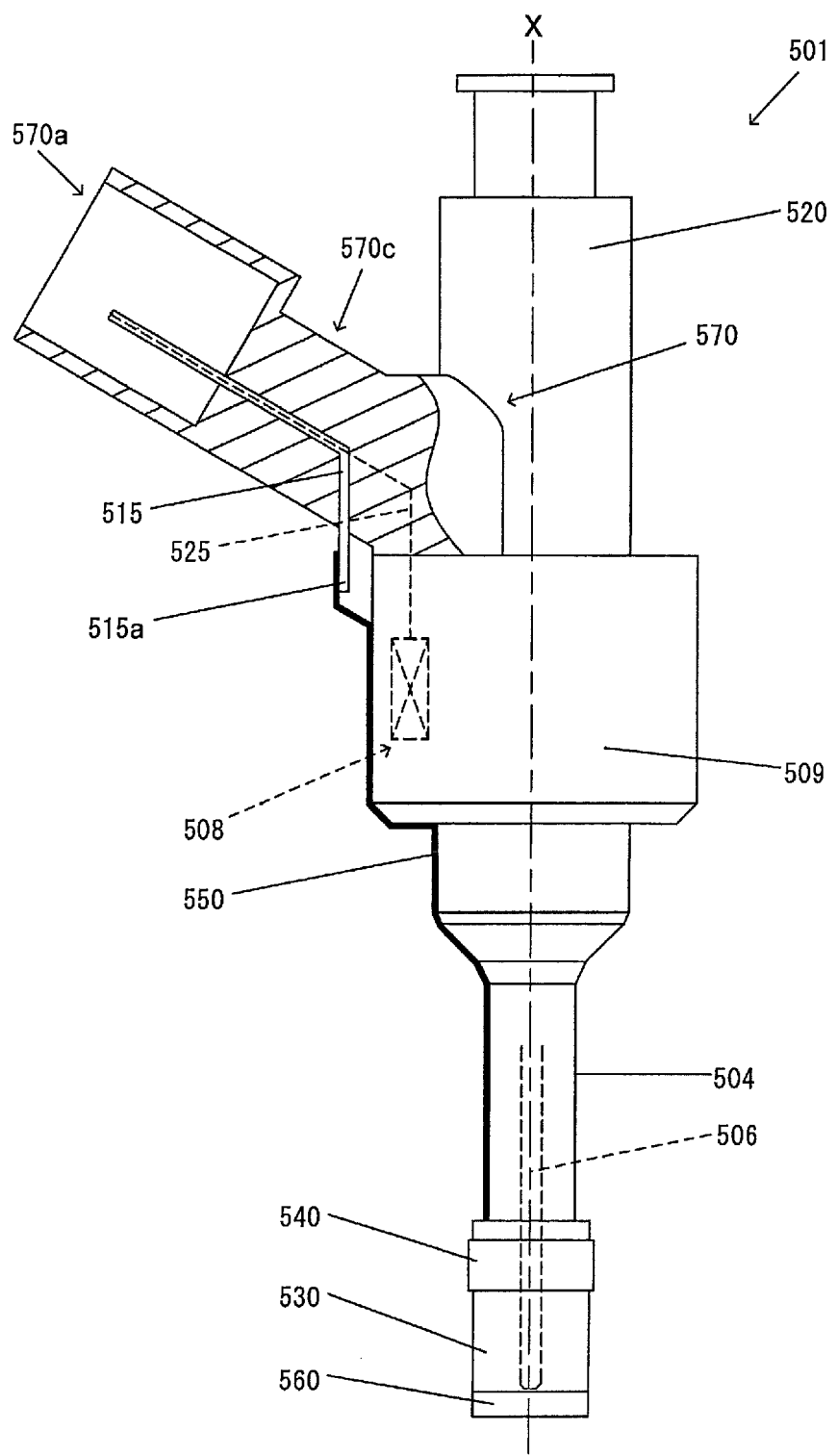
FIG. 18 is a side view of the fuel injection valve before the secondary mold member is molded thereto shown partly in section.

FIGS. 16, 17 and 18 are an external perspective view, a partly broken away perspective view and a partly in section side view of the fuel injection valve before the secondary mold member 580 is molded thereto, respectively. As shown in FIG. 18, the energization current external terminals 525 and the sensor external terminal 515 are fixedly attached to the connector mold member 570 or the primary mold member.

As shown in FIG. 17, the outer ends of the energization current external terminals 525 and the sensor external terminal 515 are exposed from the connector portion 570a of the connector mold member 570 as the energization current connecting terminals 525b and the sensor connecting terminal 515b, respectively. As shown in the drawings, because the energization current connecting terminals 525b and the sensor connecting terminal 515b are arranged in the same connector portion 570a, the electric connection between the electromagnetic coil 508 and the corresponding wire 596 (See FIG. 12) and the electric connection between the pressure sensor and the corresponding wire 597 (See FIG. 12) are simplified.

As shown in FIGS. 17 and 18, the sensor external terminal 515 extends from the sensor connecting terminal 515b along the projecting part 570c of the connector mold member 570, and is bent at a point near the housing 509 toward the pressure sensor 560 before further extending in parallel with the central axial line X. The other end of the sensor external terminal 515 remote from the sensor connecting terminal 515b is formed as a projecting part 515a which projects from a part of the sloped portion 570b of the projecting part 540c of the connector mold member 570 facing the pressure sensor 560 toward the side of the pressure sensor as shown in FIGS. 16 and 18.

Figure 19:
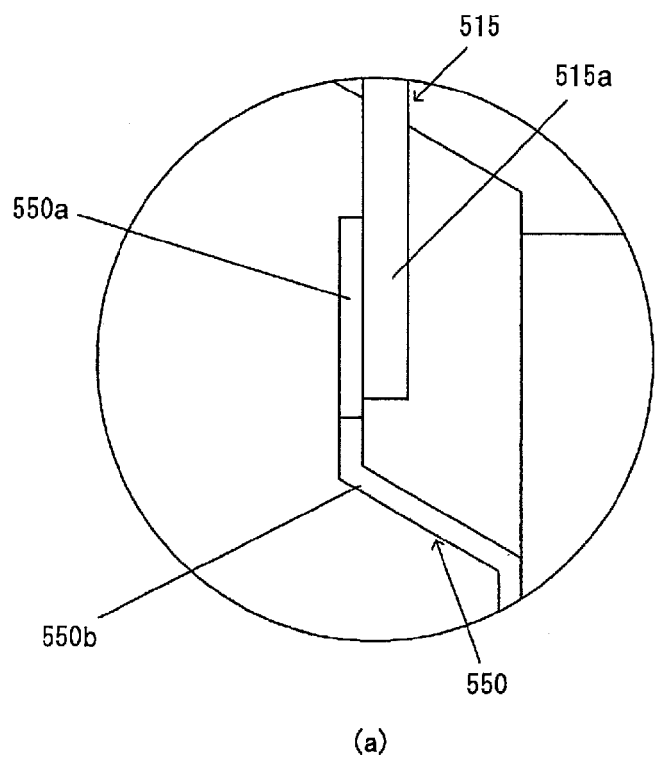
FIG. 19(*a*) is a view illustrating the process of positioning the signal wire relative to the projecting part, and FIG. 19(*b*) is a view illustrating the process of connecting the signal wire relative to the projecting part.
Figure 19:
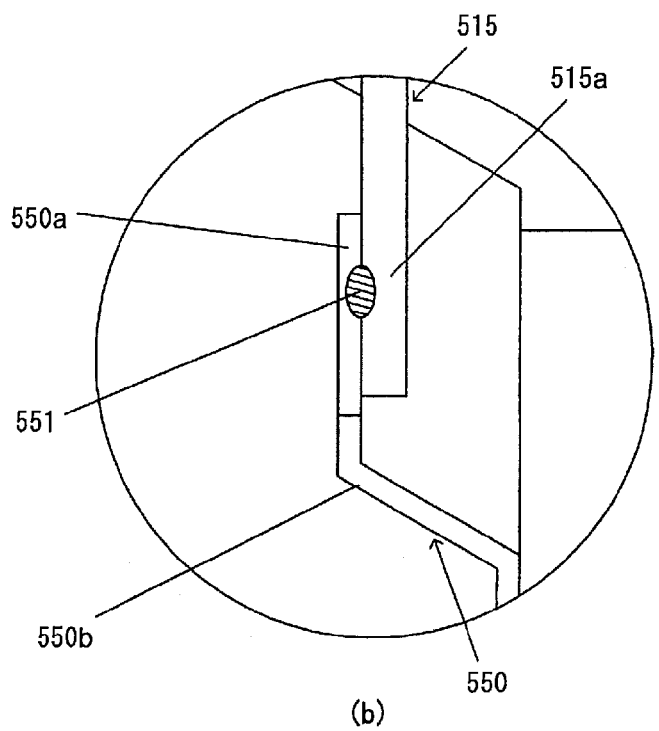
Figure 20:
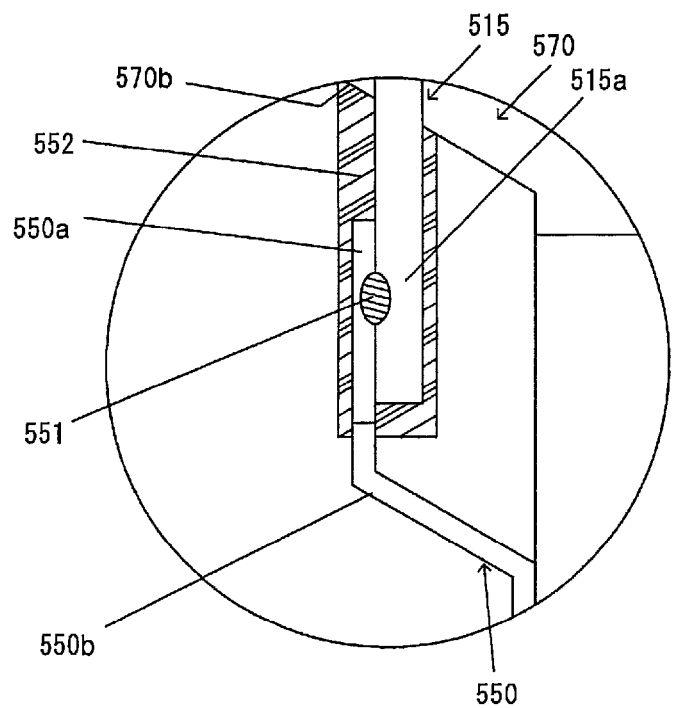
FIG. 20(*a*) is a view illustrating the process of applying a bonding agent to the connected part between the signal wire and the projecting part, and FIG. 20(*b*) is a view illustrating the process of molding the secondary mold member.
Figure 20:
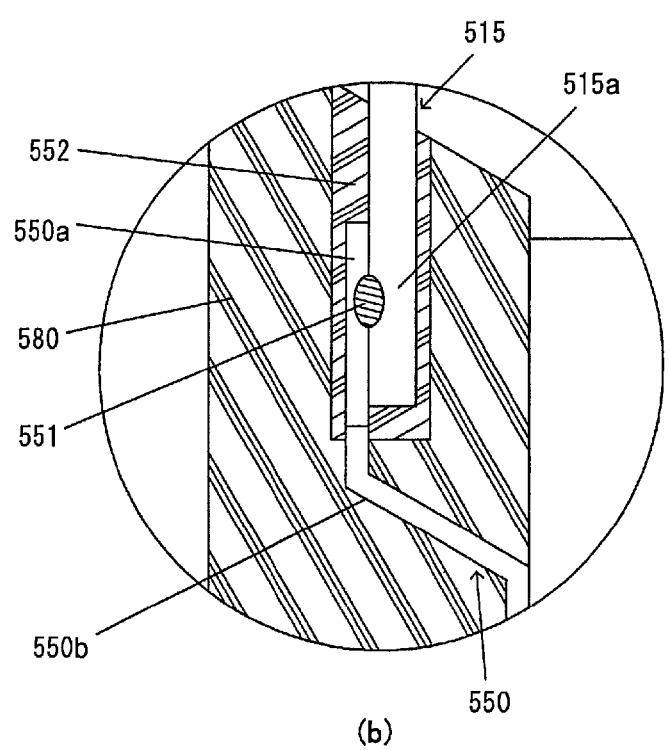

Referring to FIGS. 19 and 20, the connection between the signal wire 550 and the sensor external terminal 515 fixed to the connector mold member 570 is described in the following. FIGS. 19(*a*) and 19(*b*) are views showing the processes of positioning and connecting the signal wire 550 and the projecting part 515a to each other, respectively. FIG. 20(*a*) is a view showing the process of bonding the signal wire 550 to the projecting part 515a, and FIG. 20(*b*) is a view showing the process of secondary molding. In FIGS. 19 and 20, the connecting portion between the signal wire 550 and the projecting part 515a is shown in an enlarged scale.

As shown in FIG. 19(*a*), before connecting the signal wire 550 and the projecting part 515a to each other, the signal wire 550 and the projecting part 515a are positioned to each other. As shown in FIG. 19(*a*), the conductor is exposed at the end part of the signal wire 550 by peeling off the sheath 550b thereof in advance. This exposed part 550a from which the sheath 550b was removed is positioned so as to be in contact with the projecting part 515a.

After this positioning process, as shown in FIG. 19(*b*), the exposed part 550a of the signal wire 550 is electrically connected to the projecting part 515a by depositing solder 551 thereonto. Upon completion of the soldering process, as shown in FIG. 20(*a*), a silicone bonding agent is applied to the entire circumference of the exposed part 550a of the signal wire 550 and the projecting part 515a in the electrically connected part, and is also applied to the sloped portion 570b of the connector mold member 570. Once the silicone bonding agent is cured, a layer 552 of the silicone bonding agent is formed around the circumference of the exposed part 550a of the signal wire 550 and the projecting part 515a. The layer 552 of the silicone bonding agent is in intimate contact with the sloped portion 570b of the projecting part 515a.

In the secondary molding process, as shown in FIG. 20(*b*), the secondary mold member 580 is molded by a per se known injection molding process so that the outer periphery of the housing 509 and the nozzle member 504, and the base part of the sloped portion 570b of the projecting part 570c are covered by the secondary mold member 580. As a result, the signal wire 550 attached to the outer circumferential surface of the housing 509 and the nozzle member 504, and the connecting portion between the signal wire 550 and the projecting part 515a are covered by the secondary mold member 580.

In other words, as shown in FIG. 20(*b*), the exposed part 550a of the signal wire 550 and the projecting part 515a are covered by the layer 552 of the silicone bonding agent, and the layer 552 of the silicone bonding agent is in turn covered by the secondary mold member 580. Therefore, the exposed part 550a of the signal wire 550 and the projecting part 515a are doubly covered so that a high level of water proofing can be achieved.

Figure 21:
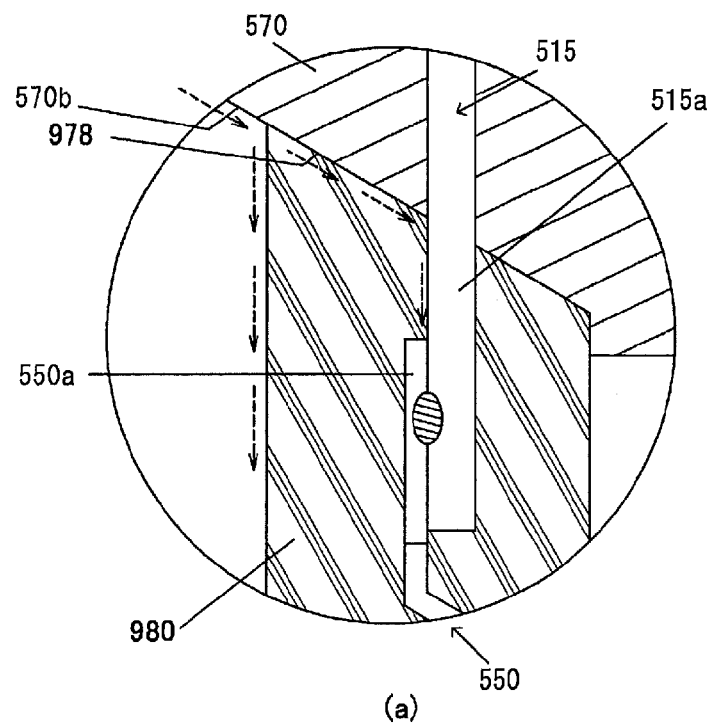
FIG. 21 is a view illustrating how the moisture advances in the interface between the connector mold member and the secondary mold member.
Figure 21:
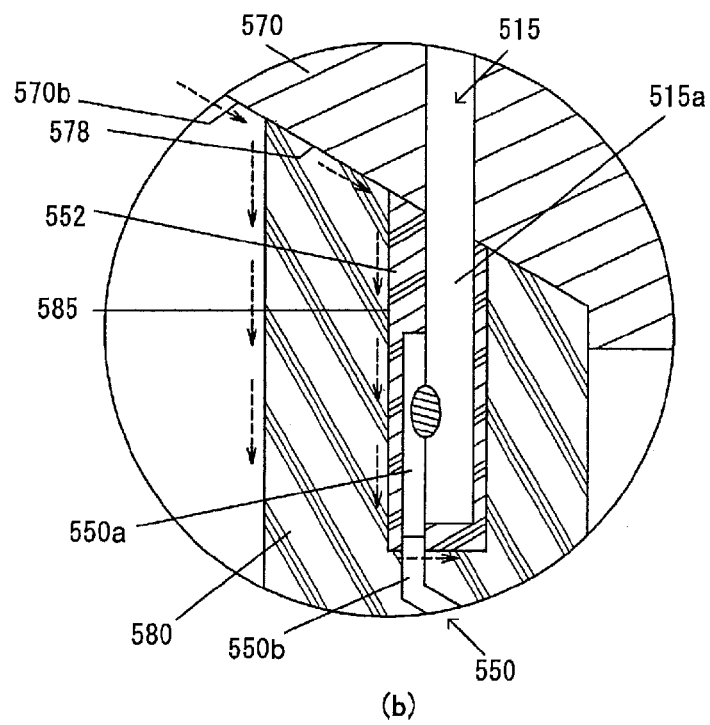

Referring to FIG. 21, the improvement in the water proofing performance owing to the covering of the exposed part 550a of the signal wire 550 and the projecting part 515a with the layer 552 of the silicone bonding agent and the secondary mold member 580 is compared with that of a conventional example. FIG. 21(*a*) shows the example for comparison in which the secondary mold member 980 is formed without the presence of the layer 552 of the silicone bonding agent, and FIG. 21(*b*) shows the second embodiment of the present invention. In FIGS. 21(*a*) and 21(*b*), the movement of moisture in the interface 578 between the connector mold member 570 and the secondary mold member 580 of the present invention is compared with that that in the interface 978 between the connector mold member 570 and the secondary mold member 980 by indicating the movement of moisture with arrows.

Moisture may intrude into an engine compartment in case of a heavy rainfall. As shown in FIG. 21(*a*), the moisture that deposited on the fuel injection valve 501 flows along the sloped portion 570b of the connector mold member 570, and reaches the interface 978 between the connector mold member 570 and the secondary mold member 980. Owing to the shrinking of the plastic material of the secondary mold member 980 during the curing process in the die assembly, a small gap may be created between the secondary mold member 980 and the connector mold member 570. Therefore, the moisture may advance in the interface 978 between the connector mold member 570 and the secondary mold member 980, and reach the projecting part 515a.

On the other hand, according to the second embodiment of the present invention, as shown in FIG. 21(*b*), even when the moisture advanced in the interface 578 between the connector mold member 570 and the secondary mold member 580, any further advance is blocked by the layer 552 of the silicone bonding agent. A small gap may be created between the layer 552 of the silicone bonding agent and the secondary mold member 580, because the exposed part 550a or the projecting part 515a is not in the path of the movement of the moisture, the moisture is prevented from being deposited on the exposed part 550a or the projecting part 515a.

The second embodiment provides the following advantages.

(1) The fuel injection valve 501 includes the nozzle member 504, the electromagnetic coil 508, the pressure sensor 560, the energization current external terminal 525, the sensor external terminal 515, the connector mold member 570 and the signal wire 550. The pressure sensor 560 is attached to the front end of the nozzle member 504 to detect the pressure in the cylinder. The energization current external terminal 525 is connected to the wire 596 for supplying electric current to the electromagnetic coil 508 at one end thereof, and to the electromagnetic coil 508 at the other end thereof. The sensor external terminal 515 is connected to the wire 597 for obtaining the detection signal of the pressure sensor 560 at one end thereof, and to the signal wire 550 at the other end thereof.

The signal wire 550 is connected to the pressure sensor 560 at one end thereof, and to the other end of the sensor external terminal 515 at the other end thereof. The other end of the sensor external terminal 515 terminates as the projecting part 515a projecting from the connector mold member 570, and the other end of the signal wire 550 terminates as the exposed part 550a free from the sheath 550b. The projecting part 515a of the sensor external terminal 515 and the exposed part 550a of the signal wire 550 are electrically connected to each other via the solder 551.

The projecting part 515a of the sensor external terminal 515 and the exposed part 550a of the signal wire 550 are covered by the layer 552 of silicone bonding agent, and the layer 552 of the silicone bonding agent is in turn covered by the secondary mold member 580.

As a result, even when moisture has intruded into the interface 578 between the connector mold member 570 or the primary mold member and the secondary mold member 570, the moisture is prevented from advancing by the layer 552 of the silicone bonding agent. As a result, the water proofing performance of the electric connection between the sensor external terminal 515 and the signal wire 550 can be enhanced.

(2) Because the energization current external terminal 525 and the sensor external terminal 515 are retained by the same single connector mold member 570, the electrical connection of the fuel injection valve 501 with an external circuit is facilitated.

(3) The fuel injection valve 501 includes the cylindrical tip seal holder 530 mounted on the nozzle member 504 and the annular tip seal 540 mounted on the tip seal holder 530 so as to seal the interface between the inner circumferential surface of the injector hole 503 and the outer circumferential surface of the tip seal holder 530. Therefore, by adapting the tip seal holder 530 to the diameter of the injector hole 503, the dimension D of the gap between the fuel injection valve 501 and the injector hole 503 on the pressure sensor side of the tip seal holder 530 can be maintained to be no more than a prescribed value so that the tip seal 540 is prevented from melting.

In other words, according to this embodiment, the tip seal holder 530 may be formed so as to correspond to the diameter of the injector hole 503, and the nozzle member 504 is not necessarily required to be adapted to the diameter of the injector hole 503. Therefore, the nozzle member 504 of the same configuration may be placed in various injector holes 503 having different diameters, and this contributes to the improvement in the production efficiency.

The nozzle member 504 of the fuel injection valve 501 is formed with a stepped portion 549 configured to engage an end of the tip seal holder 530. By press fitting the tip seal holder 530 onto the nozzle member 504 until an end of the tip seal holder abuts the stepped portion 549, the positioning of the tip seal holder 530 can be accomplished in a simple manner. Owing to the simplification of the positioning process, the production efficiency can be improved, and the manufacturing cost can be reduced.

(4) The nozzle member 504 of the fuel injection valve 501 is provided with the stepped portion 549 for engaging an end of the tip seal holder 530. When assembling the tip seal holder 530 to the nozzle member 504, the tip seal holder 530 is press fitted onto the nozzle member 504 until an end of the tip seal holder 530 is engaged by the stepped portion 549 so that the positioning of the tip seal holder 530 is simplified, and this also increases productivity and reduces the cost.

(5) An insertion groove 532 is formed in the inner circumferential surface of the tip seal holder 530 along the central axial line X. Therefore, the pressure sensor 560 mounted on the front end of the nozzle member 504 can be electrically connected to the sensor external terminal 515 without compromising the sealing performance.

(6) The outer circumferential surface of the tip seal holder 530 is formed with the circumferential groove 531 for receiving the tip seal 540 so that the fitting of the tip seal 540 in the tip seal holder 530 is simplified. Also, the groove 531 can effectively retain the tip seal 540 in the prescribed position so that the leakage of combustion gas from the cylinder can be avoided with a high reliability.

Third Embodiment

Figure 22:
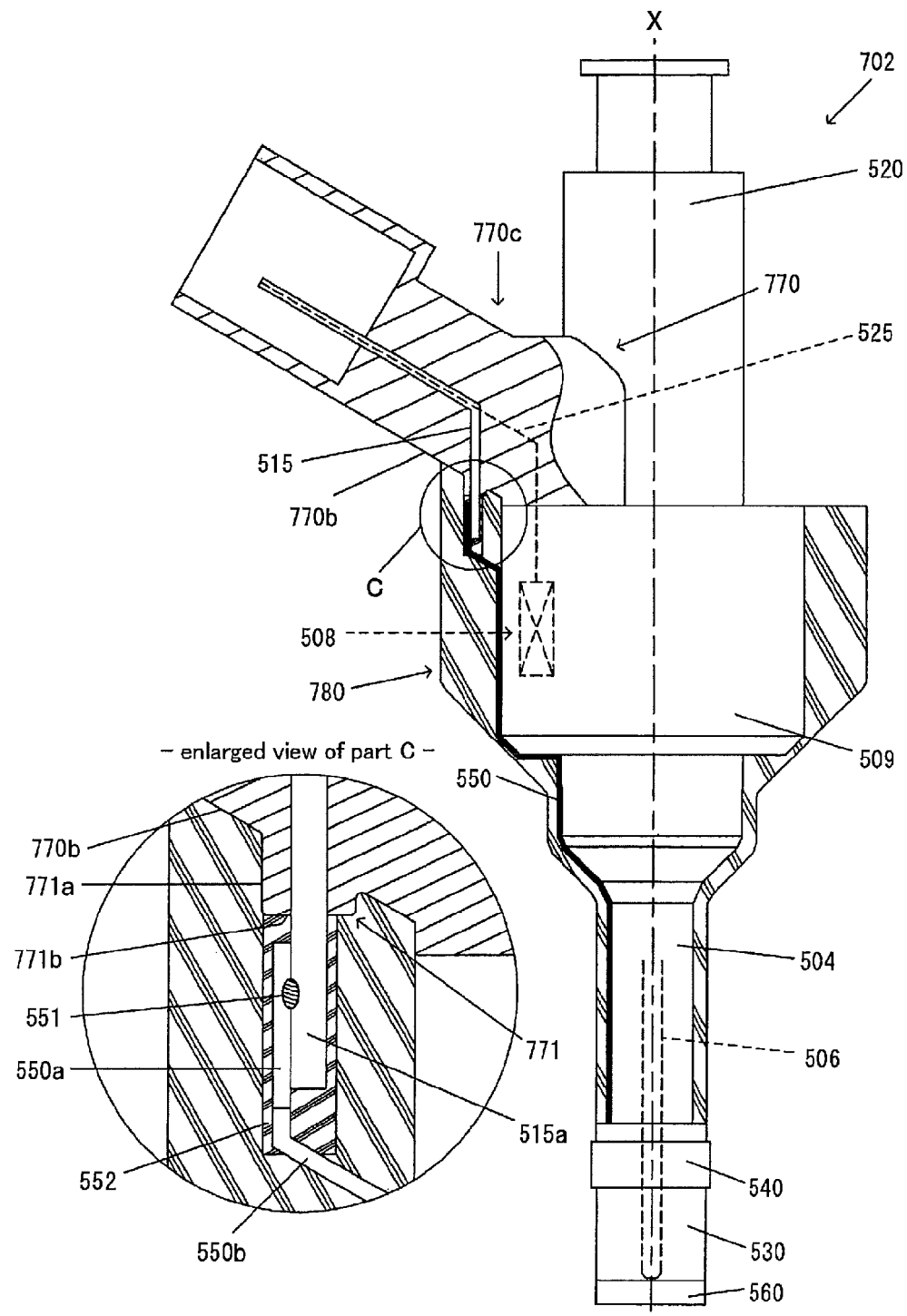
FIG. 22 is a side view of the fuel injection valve given as a third embodiment shown partly in section.
Figure 23:
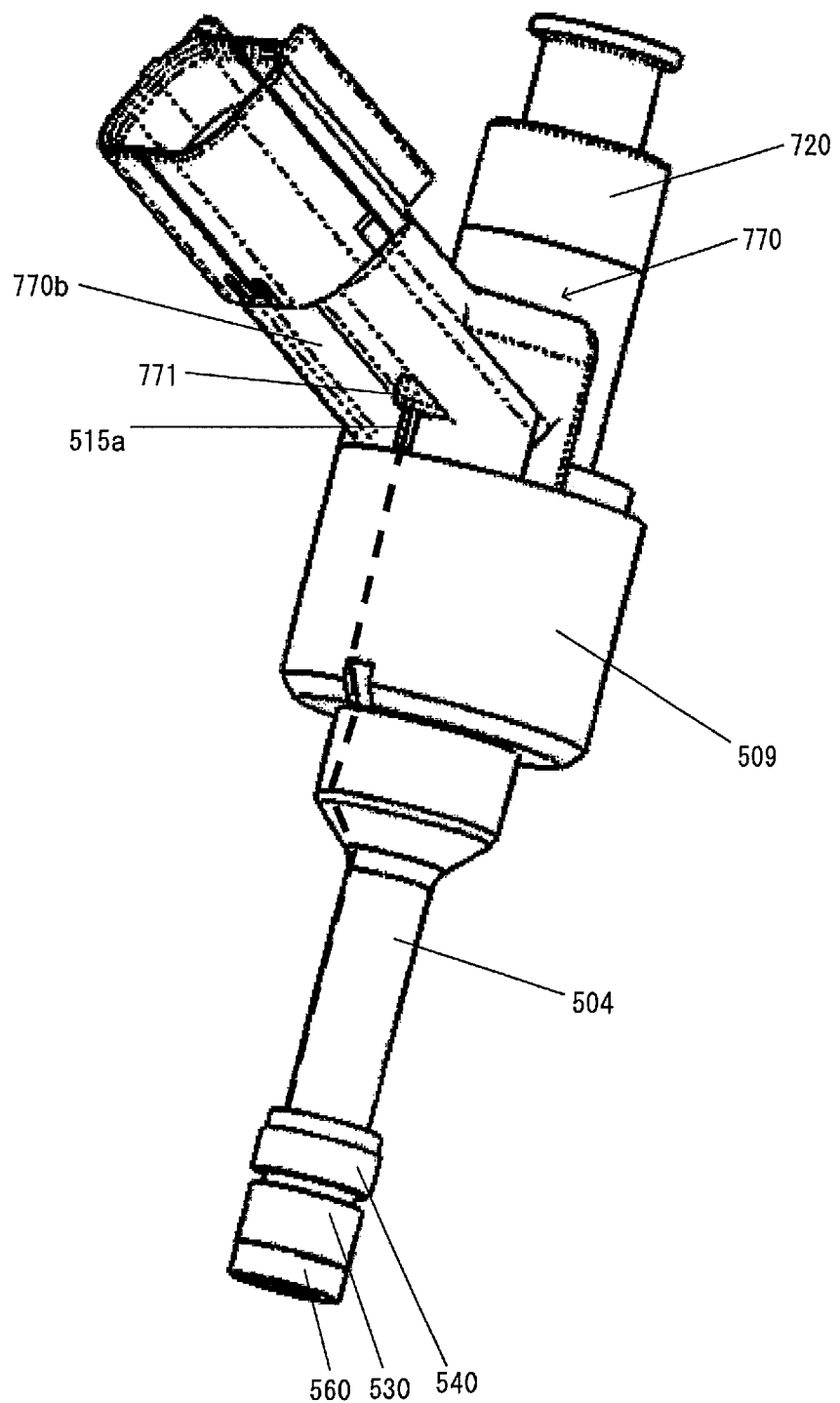
FIG. 23 is an external perspective view of the fuel injection valve before the second mold member is molded thereto.

A fuel injection valve 701 given as a third embodiment of the present invention is described in the following with reference to FIGS. 22 and 23. FIG. 22 is a partly in section side view showing the fuel injection valve 701 of the third embodiment, and FIG. 23 is an external perspective view showing the fuel injection valve 701 before the secondary mold member 780 is molded thereto. In the following description, the parts corresponding to those of the previous embodiments are denoted with like numerals without necessarily repeating the description of such parts. Thus, only the parts that differ from those of the previous embodiments are described in great detail in the following description.

In the second embodiment, the projecting part 515a projected from the sloped portion 570b of the projecting part 570c of the connector mold member 570 facing the pressure sensor 560 in parallel with the central axial line X of the fuel injection valve 501 (See FIG. 13). In the third embodiment, a protrusion 771 projects from the sloped portion 770b of the projecting part 770c of the connector mold member 770 facing the pressure sensor 560 in parallel with the central axial line X of the fuel injection valve 701.

The protrusion 771 includes a planar side surface 771a extending in parallel with the central axial line X and a top surface 771b extending perpendicularly to the central axial line X. In the third embodiment, the projecting part 515a of the sensor external terminal 515 projects from the top surface 771b of the protrusion 771 toward the pressure sensor 560.

According to this third embodiment, the advantages similar to those of the second embodiment can be obtained. Furthermore, according to the third embodiment, the path length for the moisture that may intrude into the interface between the secondary mold member 780 and the connector mold member 770 (or the primary mold member) to reach the layer 552 of the silicone bonding agent can be increased. Therefore, even when moisture should intrude into the interface, the moisture will evaporate before reaching the layer 552 of silicone bonding agent. Therefore, the third embodiment provides an even more enhanced water proofing performance than the second embodiment.

The following modifications are also within the purview of the present invention, and one or a plurality of these modifications may be combined with any of the foregoing embodiments.

(1) The sensor provided on the front end of the fuel injection valve 501 consisted of a pressure sensor 560 in the foregoing embodiments, but the present invention is not limited by such embodiments. For instance, a thermocouple for detecting the temperature in the cylinder may be mounted on the free end of the fuel injection valve as such a sensor without departing from the spirit of the present invention.

(2) The protrusion 771 is caused to intrude into the interface between the connector mold member 770 and the secondary mold member 780 for the purpose of increasing the path length which the moisture must travel in order to reach the layer 552 of the silicone bonding agent in the third embodiment, but the shape of the protrusion 771 is not limited to that given in the third embodiment. Even more irregularly shaped protrusions may also be used for increasing the path length of the moisture even further.

(3) The insertion groove 532 was provided in the inner circumferential surface of the tip seal holder 530 in the foregoing embodiments, but the present invention is not limited by such embodiments. Instead of providing the insertion groove 532 in the inner circumferential surface of the tip seal holder 530, an insertion groove may be formed in the outer circumferential surface of the nozzle member 504 along the central axial line X to receive the signal wire 550 connecting the pressure sensor 560 to the sensor external terminal 515 therein.

(4) The exposed part 550a of the signal wire 550 was electrically connected to the projecting part 515a via the solder 551 in the foregoing embodiments, but the present invention is not limited by such embodiments. For instance, a low-temperature sinter bonding material containing silver foil and small metallic particles may also be used for connecting the exposed part 550a of the signal wire 550 to the projecting part 515a.

Although the present invention has been described in terms of preferred embodiments thereof, it is obvious to a person skilled in the art that various alterations and modifications are possible without departing from the scope of the present invention.

GLOSSARY 1 internal combustion engine
3 cylinder head (engine main body)
7 combustion chamber
19 injector hole
30 fuel injection device
32 fuel passage
33 valve body
34 nozzle member
37 solenoid (actuator)
38 sensor
39 first resin portion
40 second resin portion (covering material)
41 first body
42 second body
43 third body
45 small diameter portion
46 tapered portion
47 large diameter portion
51 shaft portion
56 tubular portion
57 end wall
65 injection orifice
83 first solenoid wire (drive signal transmitting member)
84 second solenoid wire (drive signal transmitting member)
91 first sensor wire (sensor signal transmitting member)
92 seal device
93 collar member
94 seal groove
95 gas seal member
97 engagement groove
98 first receiving groove (receiving groove)
99 tapered surface
100 bonding agent (covering member)
101 recess
103 second receiving groove (receiving groove)
105 first engagement groove
106 second engagement groove
108 stay member
114 base portion
120 connector portion
121 wall portion
122 engagement portion
124 sensor connecting terminal (first connecting terminal)
125 first solenoid connecting terminal (second connecting terminal)
126 second solenoid connecting terminal (second connecting terminal)
128 second sensor wire
129 free end surface
131 clip
133 shield member
134 grounding portion
135 trunk portion
136 annular portion
138 first branch portion
139 second branch portion
143 first part
144 second part
146 fifth engagement groove
148 engagement projection
150 shield cover
152 tolerance ring
A axial line
B radial line
500 fuel injection device
501 fuel injection valve
502 cylinder head
503 injector hole
504 nozzle member
506 moveable valve member
508 electromagnetic coil
509 housing
515 sensor external terminal
515a projecting part
515b sensor connecting terminal
520 core
525 energization current external terminal
525b energization current connecting terminal
530 tip seal holder
531 groove 532 insertion groove
538 gap
540 tip seal
549 stepped portion
550 signal wire
550a exposed part
550b sheath
551 solder
552 layer of a silicone bonding agent
560 pressure sensor
570 connector mold member
570a connector portion
570b sloped portion
570c projecting part
578 interface
580 secondary mold member
585 interface
590 ECU
591 injection amount computing unit
592 injection time computing unit
595 drive circuit
596, 597 wire
598 signal processing unit
701 fuel injection valve
770 connector mold member
770b sloped portion
770c projecting part
771 projection
771a planar side portion
771b top surface portion
780 secondary mold member
978 interface
980 secondary mold member

The invention claimed is:

1. A fuel injection device, comprising:
a valve body having a free end exposed to a combustion chamber defined in an engine main body and a base end located outside of the engine main body;
a sensor supported at the free end of the valve body to detect a state of the combustion chamber;
a sensor signal transmitting member extending from the sensor to the base end of the valve body along an exterior of the valve body to transmit a signal from the sensor;
a covering member covering the sensor signal transmitting member and securing the sensor signal transmitting member onto an exterior of the valve body;
a first resin portion molded to the base end of the valve body and provided with a connector portion internally provided with a first connecting terminal; and
a connecting member extending from the first resin portion and connected to the sensor signal transmitting member;
wherein the covering member includes a second resin portion molded to the valve body and the first resin portion, and covering the sensor signal transmitting member and a part of the connecting member projecting from the first resin portion.

2. The fuel injection device according to claim 1, further comprising:
an actuator received in the valve body;
a drive signal transmitting member extending from the actuator to transmit a drive signal to the actuator; and
a second connecting terminal provided in the connector portion and connected to the drive signal transmitting member.

3. The fuel injection device according to claim 1, wherein a receiving groove for receiving the sensor signal transmitting member is formed on an exterior of the valve body, and the covering member includes a bonding agent that covers the sensor signal transmitting member and fixedly secures the sensor signal transmitting member.

4. The fuel injection device according to claim 1, further comprising a stay member attached to an exterior of the valve body to support a base end of the sensor signal transmitting member, the stay member being covered by the second resin portion.

5. The fuel injection device according to claim 1, wherein the first resin portion and the second resin portion are provided with interlocking engagement features on mutually contacting parts thereof.

6. The fuel injection device according to claim 1, wherein the valve body and the second resin portion are provided with interlocking engagement features on mutually contacting parts thereof.

7. The fuel injection device according to claim 1, further comprising a seal device provided on an exterior of the valve body for sealing an interface between the valve body and the engine main body, wherein the seal device and the second resin portion are in contact with each other and provided with interlocking engagement features on mutually contacting parts thereof.

8. The fuel injection device according to claim 7, wherein the seal device is provided with a collar member fitted onto an outer circumference of the valve body, and a flexible member fitted on an exterior of the collar member to seal an interface between the collar member and the engine main body, and
an engagement portion is formed in an outer circumferential part of the collar member located more outward of the engine main body than the flexible member to engage a tool for retaining the collar member when press fitting the collar member onto the valve body.

9. The fuel injection device according to claim 1, wherein the sensor signal transmitting member consists of a flexible printed circuit board, and is bent in conformity with an outer contour of the valve body.

* * * * *